(12) United States Patent
Grubb et al.

(10) Patent No.: US 12,249,328 B2
(45) Date of Patent: Mar. 11, 2025

(54) TECHNIQUES FOR COMMUNICATION BETWEEN HUB DEVICE AND MULTIPLE ENDPOINTS

(71) Applicant: Apple Inc., Cupertino, CA (US)

(72) Inventors: Jared S. Grubb, San Francisco, CA (US); Robert M. Stewart, San Jose, CA (US); Gabriel Sanchez, San Jose, CA (US); Anshul Jain, San Diego, CA (US); Zaka ur Rehman Ashraf, Pleasanton, CA (US); David J. Chandler, San Diego, CA (US); Andrew Byrne, San Diego, CA (US); Anumita Biswas, Saratoga, CA (US); Minsub Lee, San Jose, CA (US); Mahesh Shanbhag, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 231 days.

(21) Appl. No.: 17/718,977

(22) Filed: Apr. 12, 2022

(65) Prior Publication Data

US 2022/0335938 A1 Oct. 20, 2022

Related U.S. Application Data

(60) Provisional application No. 63/175,473, filed on Apr. 15, 2021.

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/165* (2013.01); *G06F 21/44* (2013.01); *G10L 15/08* (2013.01);
(Continued)

(58) Field of Classification Search
None
See application file for complete search history.

(56) References Cited

U.S. PATENT DOCUMENTS 11,924,254 B2 3/2024 Hansen et al.
2006/0031612 A1 2/2006 Bashford et al.
(Continued)

FOREIGN PATENT DOCUMENTS

CN 117136352 A 11/2023
CN 110308886 B 3/2024
(Continued)

OTHER PUBLICATIONS

Application No. PCT/US2022/024531, International Search Report and Written Opinion, Mailed on Jul. 18, 2022, 16 pages.
(Continued)

*Primary Examiner* — Quynh H Nguyen
(74) *Attorney, Agent, or Firm* — Kilpatrick Townsend & Stockton LLP

(57) ABSTRACT

Techniques are disclosed for coordinating interactions between a user device and a plurality of accessory devices. In one example, a user device receives information identifying one or more accessory devices in communication with the user device. The user device may implement accessory interaction instances for each of the identified accessories. A first accessory interaction instance can be associated with a first accessory among the identified accessories and receive a first audio input from the first accessory corresponding to a user request. The first accessory interaction instance can process a portion of the received audio input and receive a first response from a server computer. The user device may then transmit the first response to the first accessory device.

20 Claims, 9 Drawing Sheets

(51) Int. Cl.
  *G06F 21/44* (2013.01)
  *G10L 15/08* (2006.01)
  *G10L 15/30* (2013.01)

(52) U.S. Cl.
  CPC ........ *G10L 15/30* (2013.01); *G10L 2015/088* (2013.01); *G10L 2015/223* (2013.01)

(56) References Cited

U.S. PATENT DOCUMENTS

| | | |
|---|---|---|
| 2015/0195357 A1 | 7/2015 | More et al. |
| 2016/0378950 A1* | 12/2016 | Reiner .................. G16H 70/40 705/2 |
| 2017/0160952 A1 | 6/2017 | Nakanishi et al. |
| 2018/0240456 A1 | 8/2018 | Jeong |
| 2019/0081810 A1 | 3/2019 | Jung |
| 2019/0213156 A1 | 7/2019 | Goyal |
| 2020/0051558 A1 | 2/2020 | Yeon et al. |
| 2021/0375279 A1 | 12/2021 | Lee et al. |
| 2021/0378279 A1 | 12/2021 | Urbonaite-Zuke et al. |
| 2022/0093105 A1 | 3/2022 | Choi et al. |
| 2022/0335938 A1 | 10/2022 | Grubb et al. |
| 2022/0337691 A1 | 10/2022 | Grubb et al. |
| 2023/0035128 A1 | 2/2023 | Barscevicius et al. |
| 2023/0082944 A1 | 3/2023 | Ren et al. |
| 2023/0113883 A1 | 4/2023 | Carbune et al. |
| 2023/0397269 A1 | 12/2023 | Turner et al. |

FOREIGN PATENT DOCUMENTS

| | | |
|---|---|---|
| KR | 20230165061 A | 12/2023 |
| WO | 2019231537 A1 | 12/2019 |

OTHER PUBLICATIONS

"Notice of Allowance," mailed Oct. 18, 2023 in U.S. Appl. No. 17/718,984. 8 pages.

U.S. Appl. No. 17/719,086, "Notice of Allowance", May 13, 2024, 9 pages.

* cited by examiner

TECHNIQUES FOR COMMUNICATION BETWEEN HUB DEVICE AND MULTIPLE ENDPOINTS

CROSS-REFERENCES TO RELATED APPLICATIONS

This application claims priority under 35 U.S.C. § 119(e) to U.S. Provisional Application No. 63/175,473, entitled "TECHNIQUES FOR COMMUNICATION BETWEEN HUB DEVICE AND MULTIPLE ENDPOINTS," filed on Apr. 15, 2021; the contents of which are herein incorporated by reference.

BACKGROUND

Techniques exist for multiple user devices in a home environment to communicate among the multiple devices. For example, a user can interact with a device that provides a digital assistant program. This device, via the digital assistant, can communicate with other devices to perform requests from the user, including controlling smart accessory devices such as light switches, speakers, and thermostats. However, controlling smart device functionality has continued challenges. A user may not have direct access to a user device with a digital assistant to provide the desired interaction. Accessory devices can have many different features and capabilities and are produced by various manufacturers. In a home environment, a user may want to interact with accessories by voice command in the same manner as they would interact with a user device with a device assistant.

BRIEF SUMMARY

Embodiments of the present disclosure can provide methods, systems, and computer-readable media for providing interaction management between accessory devices that receive audio user requests and user devices that process those requests. In some examples, a user device can be associated with one or more accessories and can implement separate instances of device assistant applications to manage user requests at the accessories.

According to one embodiment, a method may be executed by a computer system within a home environment. The computer system can be a user device such as a smartphone, a tablet, a smart television (TV) media streaming device, a smart hub speaker, or the like. The user device may receive information identifying one or more accessories present within the home environment. The user device can use the information to form associations with the identified accessories. In forming the associations, the user device may implement an instance of one or more processes or other applications corresponding to the associated accessories. The instance can be a device assistant application or other processes for analyzing human speech or other audio signals.

In some examples, the user device can receive an audio input from one or more of the associated accessory devices. The audio input can be audio data transmitted in a streaming fashion from the accessory to the user device. At least a portion of this audio input can correspond to an audio trigger or wake word. A first accessory interaction instance corresponding to the accessory transmitting the audio input can receive the audio and process it. In some embodiments, the processing may include transmitting some or all of the received audio input to a server computer or cloud service for robust language analysis. The server computer can parse and analyze the audio to determine whether the audio corresponds to an identified user within the home, whether it is a user request or command, in what language any spoken audio is presented, what a suitable response should be, and whether the user or the transmitting accessory device is authorized to make the identified request or receive the determined response. The first interaction instance can then receive the response and transmit it to the accessory device.

In other embodiments, the accessory interaction instance can also execute another process or operation as part of the received response. This can include setting a timer, instructing another device to take some action (like turning off a light), or invoking a music streaming service to transmit audio to the accessory device. The accessory instance can also delegate the execution of the response to another device, including another accessory that may be more suitable for the response.

In some embodiments, a user device may receive a second audio input from a second accessory device. Because each associated accessory has its own interaction instance at the user device, this second audio input can be processed contemporaneously with the first audio input. At least a portion of the second audio input can correspond to a trigger or wake word. The second accessory interaction instance can process this portion of the second audio input to determine if a wake word is present. The instance may also determine if the second accessory is authorized to interact with the instance. If the wake word is present and the second accessory is authorized, the second interaction instance can process the remainder of the second input audio in a manner similar to the processing of the first audio.

To effect the interaction between the accessory devices and the user device, in some embodiments the accessory devices can each include a software development kit ("SDK") within their memories. This software can be provided by an entity associated with the user device (e.g., the manufacturer) so that regardless of the manufacturer of the accessory devices, they can communicate with a particular user device. The accessory interaction instances can be configured to communicate with the SDK, which may include transmitting accessory settings from the accessories to the user device for management. The SDK may also provide additional features including wake word detection for the audio input received at the accessory devices.

DETAILED DESCRIPTION OF THE EMBODIMENTS

Figure 1:
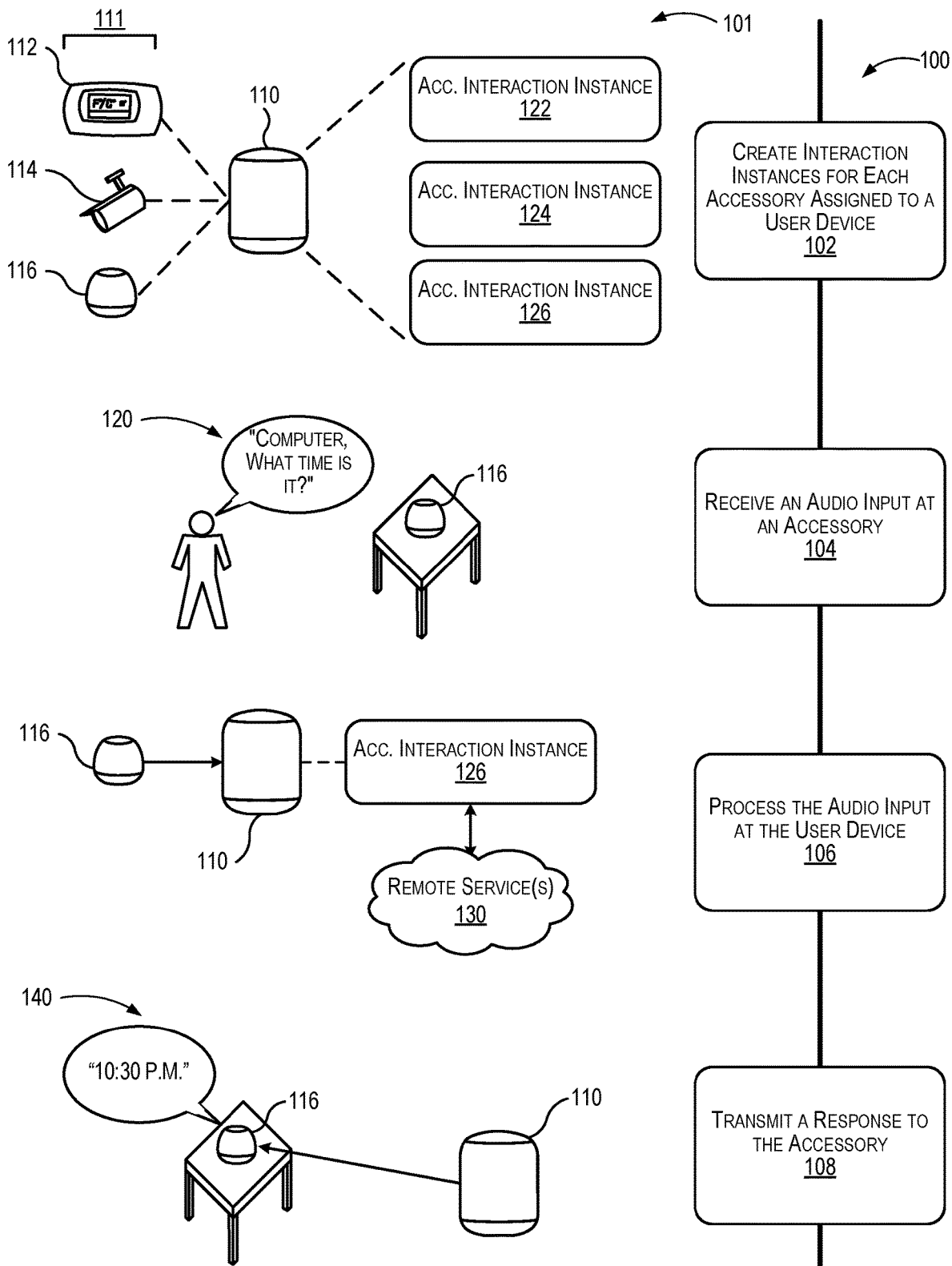
FIG. 1 is a simplified block diagram of an example method, according to some embodiments.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Embodiments of the present disclosure can provide techniques for coordinating interactions between a user device and a plurality of accessory devices. As a first example, consider a home environment corresponding to a home. A person within the home may want to know the current time. The person may query an accessory device (e.g., a nearby smart speaker) within the home environment with a verbal request (e.g., "What time is it?"). The accessory device can determine that the request was intended for the device and then transmit the received audio information to a user device (e.g., a hub speaker). The user device can process the audio information to determine the nature of the request and prepare a corresponding response (e.g., "It is 10:30 p.m."). Alternatively, or partly in combination with the above, the user device may transmit some or all of the verbal request to a server computer (e.g., implementing a service provider), where the service provider can determine the nature of the request and/or prepare a corresponding response. The user device can then transmit the response back to the accessory device for playback to the user. In another example, the user may have a request that does not require a response (e.g., "Turn off the lamp."). The user device can process the audio request to identify another device or devices corresponding to the request and transmit instructions to the other device to execute the request (e.g., instructing a device controlling the lamp to switch off). Similarly to the alternative noted above, the user device may transmit the request that does not require a response to a service provider, which can either transmit the instructions to the other device or return instructions for the other device back to the user device. In the latter case, the user device would then send the server-generated instructions to the other device.

As an illustration of the examples above, the home environment can include numerous "smart" devices, e.g., electronic devices with features allowing them to operate, to some extent, interactively and autonomously. The smart devices can have various functionality, including cameras, speakers, thermostats, headphones and headsets, phones, or media players. The smart devices can also have various network communication capabilities, including WiFi, Ethernet, Bluetooth, Zigbee, cellular, and the like. The devices can be produced by various manufacturers. In some instances, the smart devices may be categorized into user devices and accessory devices. A user device can be a resident device of the home (e.g., a smart speaker, a smart digital media player configured to control a television (TV), a mobile phone, etc.). While not always, in some examples, a resident device may be expected to reside within the home and not move (e.g., within the home or to outside of the home) often. A user device can have capabilities equal to or exceeding the capabilities of an accessory device. For example, a user device can be a mobile phone, which can include wireless (e.g., WiFi) and cellular communications capabilities, multimedia capabilities, and a device assistant. In this same example, an accessory device can be a smart speaker, which can include audio media and wireless communications capabilities but lack a device assistant. A device assistant can be a virtual assistant program configured to interact with a user. In these examples, depending on its capabilities, a smart speaker can be either a user device or an accessory device. In some examples, if an accessory is manufactured by an entity different from the entity that manufactured the user devices, the accessory may not initially be configured to with the ability to communicate with the user devices. In some instances, the user device manufacturer may provide an accessory development kit ("ADK") for installation on the accessory that enables such communication either after the accessory is manufactured, sold, provisioned, or used.

In some embodiments, the user device can obtain information about the accessory devices present in the home environment. This information can be obtained by the user device communicating directly with accessory devices sharing the same network within the home environment. In other embodiments, information about accessory devices can be sent to the user device by a second user device, a user device configured as a leader device, or a remote server device (e.g., a service provider). For example, a user in the home may add a new accessory device to the home environment. As part of this process, the user can interact with a second user device (e.g., a mobile phone) to configure the new accessory device and send the new accessory device information to the first user device. As another example, a leader device in the home environment can have information about a plurality of accessory devices in the home environment and report information about some or all of the accessory devices to the user device. The user device can then use the information to form an association with the corresponding accessory devices. The accessory information may be stored by the user device.

The user device can associate with a plurality of accessory devices by creating an accessory interaction instance for each accessory device. The interaction instances can be software modules or processes configured to perform tasks at the user device. In some embodiments, the interaction instances can each implement and/or communicate with a device assistant. For example, a user device can receive information about an accessory smart speaker and a smart thermostat located in the home environment. The user device can create two interaction instances corresponding to a device assistant, one for each of the smart speaker and the smart thermostat. The interaction instances can be duplicates of the device assistant in some embodiments, while in other embodiments the instances can be a collection of modules including the device assistant and other processes for carrying out tasks on the user device. The interaction instances can comprise different modules or processes depending on the associated accessory and its capabilities. It should be understood that any suitable combination of processes running on the user device can be included in an interaction instance corresponding to an accessory device.

Continuing with the first example above, a user may voice a request to an accessory. For example, the user may speak into the microphone of a nearby smart speaker (or thermostat, light bulb, etc.), "Computer, what time is it?" In this example, the request ("what time is it?") may correspond to a portion of the user's audio input into the smart speaker. The opening phrase ("Computer") may correspond to a second portion of the user's audio input and can be a trigger or wake word. In some embodiments, the smart speaker may perform speech recognition processing on the wake word. Based on the processing, the smart speaker can determine if the user's speech was intended to be a request or command to which the speaker should respond. The wake word processing at the accessory device can be at a first level sufficient to identify that a command or request may be contained within the user's audio input. If so identified, the smart speaker can then transmit the user audio to a user device running an accessory interaction instance corresponding to the smart speaker. In some embodiments, the accessory device can store a copy of the audio input temporarily for transmission to the user device after processing the wake word portion. In other embodiments, upon processing the wake word portion of an audio input, the accessory device can establish a streaming audio connection with the user device to relay the portion of the user's audio input that follows the wake word. In these embodiments, the accessory device can transmit a stored copy of the wake word portion of the audio input to the user device for additional processing.

Upon receiving an audio input from the smart speaker, the user device can perform additional processing on both the wake word portion of the audio input and the portion corresponding to a request or command. For example, the user device can perform natural language processing ("NLP") on the wake word. The wake word processing at the user device can be at a second level sufficient to determine to a higher degree of probability that the wake word is present than the wake word processing performed at the accessory (e.g., at the first level). Based on this wake word processing, the user device can then process the portion of the audio corresponding to the request. If the user device determines that the wake word portion was not, in fact, an accurate wake word, it can ignore the remaining portion of the audio or terminate the audio stream from the accessory. In some embodiments, the speech processing module on the user device can be part of the accessory interaction instance. The interaction instance can also transmit all or a portion of the audio input to another device for analysis (e.g., to a service provider device). This service provider device can be a remote server computer or cloud device that can perform speech processing and parse the request for an appropriate response. In some cases, the user device performs the processing of the wake word while the remaining portion of the audio is processed remotely. Parsing the request includes determining the content and context of the user's spoken audio and providing a response for the user device to take action on. In the current example, the response would be an indication of the time, which can be determined and prepared by the user device using an appropriate process or by the remote server device, or combination of the two devices.

Once a response has been determined, the user device can execute that response. This can include preparing an audio response to transmit back to the accessory device for playback to the user. The preparation and execution of the response can take place in the interaction instance corresponding to the accessory. A response that requires a particular action can be delegated as appropriate from the interaction instance to another process on the user device or to another device with which the user device can communicate. Any response audio can be generated by a text-to-speech process within the interaction instance and transmitted to the accessory. The accessory can then play the response. Some embodiments may provide for various pre-generated audio responses that correspond to frequently encountered requests that do not require unique responses. These responses can be stored at either the user device or the accessory device. For example, if an accessory device fails to connect to a user device to transmit user audio, it can provide an audio response stored at the accessory indicating that the request could not be processed.

Expanding on the example just described, consider another scenario where a second user in the home also wants to make a request with the second accessory smart thermostat. That request might be, appropriately, "Computer, increase the temperature 3° F." As before, the thermostat can process a portion of the user's audio input to determine the presence of a wake word and, if detected, transmit the wake word and the request to the user device associated with the smart thermostat. Once received by the user device, an instance of a speech processing module and accessory interaction module, distinct from the interaction module associated with the earlier example smart speaker, can process the audio. In this way the user device can process and execute requests from multiple accessories simultaneously. The accessory interaction instance corresponding to the smart thermostat can include a thermostat management module configured to manage the ambient environment (e.g., heating or air conditioning) of a home environment. Upon processing the user request, the thermostat management module can execute the request and instruct the smart thermostat to increase its temperature setting by 3° F. In other embodiments, the thermostat management module can exist as a single instance on the user device. The accessory interaction instance corresponding to the smart thermostat can then delegate its execution of the request to that single management module, as may be desired in a system containing multiple smart thermostat accessories but a need for a unified management of the ambient environment on a user device. In several embodiments, the architecture of the accessory interaction instances and other software modules on the user device can be configured in any suitable way to improve the efficiency of request processing and execution by the interaction instances on the user device. This can include various combinations of modules and process that relate to the features and capabilities of the accessory devices and the user device.

FIG. 1 is a simplified block diagram 101 of an example embodiment. The process 100 is an example high-level process flow for a system that includes a user device 110 that can associate with various accessory devices 111 to receive a user request from an accessory. The diagram 101 shows states of the system that correspond to the blocks of the process 100. The process 100 can be performed within a home environment containing multiple user devices 110 and accessories. As described herein, the user device 110 can be a hub speaker while the accessory devices 111 can be a smart thermostat 112, a camera 114, or a smart speaker 116. Although described as being a particular device, it should be apparent that the accessory devices 111 can be several types of smart devices in various combinations and number. Similarly, although a hub speaker is depicted as the user device 110 performing the process 100, other suitable devices can perform one or more of the operations in the process 100. For example, a smartphone, media device (e.g., a smart TV), or tablet (either connected to a cellular network, to a local area network via WiFi of a home network, or to a wide area network ("WAN") can perform one or more of the operations of the process 100.

Turning to the process 100 in more detail, at block 102 the user device 110 can create one or more accessory interaction instances corresponding to one or more associated accessory devices 111. Each accessory interaction instance represents one or more software modules or processes running on the user device 110 to enable the interaction of the accessory devices 111 with the user device 110. As shown in FIG. 1, accessory interaction instance 122 can correspond to a smart thermostat 112, accessory interaction instance 124 can correspond to a camera 114, and accessory interaction instance 126 can correspond to a smart speaker 116.

At block 104, an accessory device, illustrated as the smart speaker 116, receives an audio input 120. In some embodiments, the audio input 120 can contain a portion of audio corresponding to a user request or command (e.g., "what time is it") and a second portion corresponding to a wake word (e.g., "Computer"). The wake word need not be a single word and can be a word or phrase that signals to the system that the user has or is about to voice a request, command, or other audible interaction to the system. The audio input can also be other sounds not uttered by a user, including glass breaking or a baby crying. In these cases the wake word, as described herein, can be a trigger sound corresponding to a portion of the audio input 120. In other embodiments, the portions of the audio input 120 corresponding to the wake word and the user request can be received by the accessory 116 separated by a period of time. This period of time can be sufficient to allow the user to voice the wake word and receive a confirmatory response from the accessory 116 before voicing the user request. Upon receiving input containing a wake word, the accessory 116 can process that portion of the audio input 120 at a first level to determine the presence of the wake word. The first level processing can be done in a time and resource efficient manner that determines that the wake word may be present. For example, the accessory can perform voice pattern matching using stored voice patterns corresponding to users speaking the wake word. The stored patterns can be associated with the users in a home environment containing the system or can be generic patterns that are applicable to a large number of possible users. In this way, the accessory device 116 is not burdened with sophisticated speech detection processes but also does not respond to every extraneous audio input received by users or other sources in its vicinity.

Moving down to block 106, upon detecting the wake word, the accessory device 116 can transmit the received audio input 120 to the user device 110 where it will be processed. As illustrated, the smart speaker 116 has a corresponding accessory interaction instance 126 on the user device 110, such that the accessory interaction instance 126 manages the processing of the audio input 120 received from the smart speaker 116. As described in more detail below with reference to FIG. 4, the accessory interaction instance 126 can contain modules configured to process the audio input 120. For example, accessory interaction instance 126 can include a speech detection module that can analyze the portion of the audio input 120 that corresponds to the wake word. This analysis can be at a second level that can confirm the presence of the wake word to a higher degree of probability than the wake word detection at the smart speaker 116. In addition, in some embodiments, the speech detection module can determine a user's language and perform the wake word detection based on the determined language. If the speech detection module of the accessory interaction instance 126 does not detect the wake word, the user device 110 can ignore the audio input.

The accessory interaction instance 126 can also contain modules configured to communicate with remote services 130. The remote services 130 can be provided by a remote server associated with the home environment of the user device 110 over a WAN or other network and can be, in some embodiments, a cloud server. The remote services can include NLP or other speech analysis services. If the accessory interaction instance 126 does detect the wake word, it can then process the portion of the audio input 120 corresponding to a user request by transmitting that portion to the remote services 130. The remote services 130 can analyze the request to determine the type of request, the appropriate response, and one or more devices to execute the response. In some embodiments, the remote services 130 can also determine an identity of the user making a request. This identity can be determined from user profile information accessed by the remote service 130. User profile information can be stored at the user device and transmitted to the remote services 130 as a part of the accessory interaction instance's 126 processing of the audio input 120. In some cases, the user profile information is stored on a remote device accessible by the remote services 130 or on the remote server providing the remote services 130. Once the request portion has been analyzed by the remote services 130, a response can be transmitted back to the user device 110 for execution. Upon receiving the response, the accessory interaction instance 126 can then execute the response. Execution of the response can include delegating one or more elements of the response to other processes on the user device or another device, including other user or accessory devices in the home environment or a remote device. Following the example illustrated in diagram 101, execution can include determining the current time and preparing an audio response to be played for the user. The accessory interaction instance 126 can delegate a request to a process on the user device 110 to provide the current time to the accessory interaction instance 126. The accessory interaction instance 126 can comprise a text to speech module that can convert the current time information received to an audio response.

Moving to block 108, the user device 110 can transmit the response to the accessory device 116. For responses that require an audio response 140 to the user, the accessory interaction instance 126 on the user device 110 can communicate with the smart speaker 116 and transmit the audio. As illustrated in diagram 101, the audio response 140 is the reply "10:30 p.m.," corresponding to the current time as requested by the user. Other responses can include indications that the user request was performed by another device or that the request could not be performed. In some embodiments, the accessory device 116 may not have the capability to play an audio response (e.g., it does not have a speaker output) but contains a visual user interface (e.g., a screen) or other means (e.g., lights) to indicate a response to the user.

Figure 2:
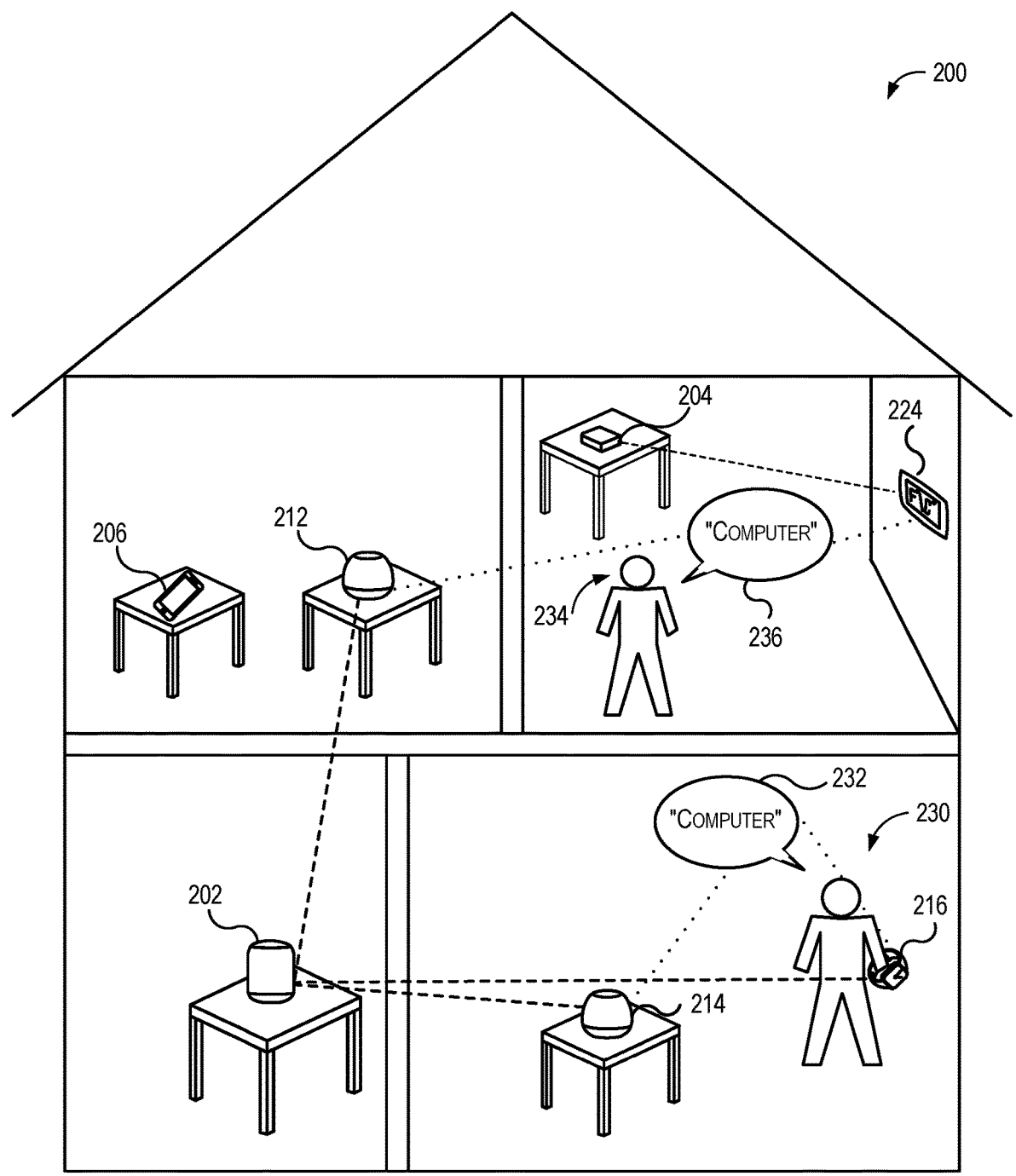
FIG. 2 is a schematic of a home environment containing user devices and accessory devices, according to some embodiments.

FIG. 2 illustrates a home environment 200 containing user devices and accessory devices, according to some embodiments. User devices can include a hub speaker 202, a media player 204, and a smartphone 206. These user devices can correspond to user device 110 from the embodiments described above with respect to FIG. 1. Accessory devices can include smart speakers 212, 214, a smartwatch 216, and a thermostat 224. Similarly, these accessory devices can correspond to accessory devices 111 described with respect to FIG. 1. All or some of these accessory devices may be third-party devices (e.g., not manufactured, programmed, or provisioned by the manufacturer, programmer, or provisioner of the user devices). Because of this, they may not be automatically and/or initially compatible with the user devices. Each user device in the home environment 200 can be associated with zero, one, or more accessory devices. As illustrated by the long-dashed lines, hub speaker 202 is associated with smart speakers 212, 214 and smartwatch 216 while media player 204 is associated with thermostat 224. The smartphone 206 is not associated with an accessory device. The devices within the home environment 200 can be configured to communicate using one or more network protocols over one or more networks associated with the home environment 200. For example, the home environment 200 can be associated with a local area network ("LAN"), a WAN, a cellular network, or other network, and the devices can communicate using a WiFi connection, a Bluetooth connection, a Thread connection, a Zigbee connection, or other communication method.

The arrangement of associations of accessory devices with user devices can include various different combinations and can be modified by the user devices. For example, the smartphone 206 may receive information about accessory devices to be associated with the smartphone. The accessory devices can include one or more of the accessory devices currently associated with other user devices in the home and can include new accessory devices added to the home. The smartphone 206 would then create accessory interaction instances for each accessory association. In some embodiments, a user device in the home environment 200 can communicate with another user device to transfer one or more accessory devices associated with the first user device to the second user device. This transfer can occur automatically based on information that the user device receives about the home environment 200, including, but not limited to, information that another user device may be more suitable for association with one or more accessories or that accessories have been added to or removed from the home environment 200. The suitability of any particular user device to associate with an accessory can be based at least in part on the capabilities of the user device, the capabilities of the accessory device, the current processing load experienced by the user device, the locations of the devices within the home environment, and the status of communications between the devices on a network. Many other criteria for rearranging device associations in a home environment are contemplated.

In some embodiments, accessory devices and non-resident user devices may also leave the home environment or lose network connectivity with the home environment. An accessory device that leaves the home environment can be disassociated by the previously associated user device, such that the user device removes the corresponding accessory interaction instance from its memory. Accessory devices associated with a user device that loses network connectivity with the home environment can be reassigned by another user device that retains network connectivity. Some embodiments may have a user device designated as a leader device to manage the assignment of accessory devices among the user devices within the home environment. In other embodiments, if user devices and accessory devices are associated and leave the home environment and lose network connectivity, the user devices can retain their associations with the accessory devices and perform the embodied methods described herein.

Returning to FIG. 2, as an example of the foregoing description of some embodiments, the hub speaker can communicate with the smartphone 206 to transfer the association with smartwatch 216. The user 230 wearing the smartwatch 216 may collect the smartphone 206 and move into a different room in the home environment, making the smartphone 206 a more suitable user device to associate with the smartwatch 216. User 230 may then leave the home environment 200 with the smartphone 206 and smartwatch 216. The smartphone 206 can retain its association with the smartwatch 216 as its accessory device even if the smartwatch 216 loses network connectivity to the other devices in the home environment. Moreover, user 230 could take an additional accessory device outside the home environment and that accessory can also be associated with the smartphone 206 such that the smartphone 206 is associated with two accessory devices while outside the home environment 200. As another example, media player 204 may begin processing and playing a media file and become unsuitable to be associated with thermostat 224 due to load. The media player 204 can transfer the association of its accessory thermostat 224 to smartphone 206 or hub speaker 202.

Continuing with FIG. 2, a home environment 200 can have multiple users 230, 234 making multiple audio requests 232, 236 of accessories. The requests 232, 236 correspond to the audio input 120 described above with reference to FIG. 1. The requests 232, 236 can occur separately or simultaneously and can be received by multiple accessory devices as depicted by the short-dashed lines. For example, request 232 can be received by smart speaker 214 or smartwatch 216, while request 236 can be received by smart speaker 212 and thermostat 224. As described previously, the arrangement of accessory devices and their associations can take various forms and can change over time. Thus, a user request may be received by multiple accessory devices associated with different user devices. For example, user request 236 is received by both thermostat 224 associated with media player 204 and by smart speaker 212 associated with hub speaker 202.

In some embodiments, accessory devices can coordinate with other accessory devices within the home environment 200 to determine which accessory device should respond to a user request that is received by one or more accessory devices. As described in more detail below with reference to FIG. 8, the selection of an accessory device to respond to an audio input can occur through an election process among the accessory devices. The election can use a score based upon criteria including, but not limited to, strength (e.g., loudness) of the received audio input at the accessory device, quality of the received audio input, the capabilities of the accessory device, and the capabilities of a user device associated with the accessory device. As an example, smart speaker 212 and thermostat 224 both receive user request 236. Upon receiving the request, both accessories can process the portion of the user request corresponding to a wake word and transmit the audio to their respective user devices, hub speaker 202 and media player 204. The accessory interaction instances associated with the respective accessories on the user devices can process the wake word received and determine a score for the accessories. The user devices can transmit the score back to the accessories prior to further processing the user request 236. The accessories can then open a communication channel between themselves and exchange scores. Each accessory compares its score to the other scores to determine a winner. The winning accessory can report to its user device that it has won. Similarly, losing accessories can report to their user devices that they have lost and will not respond to the user request. In the present example, because user 234 is in the same room as thermostat 224, it may be the case that the thermostat heard the user request 236 more loudly and clearly than smart speaker 212 in another room. Thus, the accessory election could result in the thermostat 224 being the winning accessory. Conversely, smart speaker 212 or hub speaker 202 may have capabilities that are more suitable to responding to the user request, as in the case where the request requires an audio response and the thermostat 224 does not have an audio output capability. In this scenario, the score determined for smart speaker 212 can be higher to reflect the greater capabilities and result in the smart speaker 212 winning the election. One skilled in the art would recognize a great number of potential scoring criteria for the accessory devices.

Figure 3:
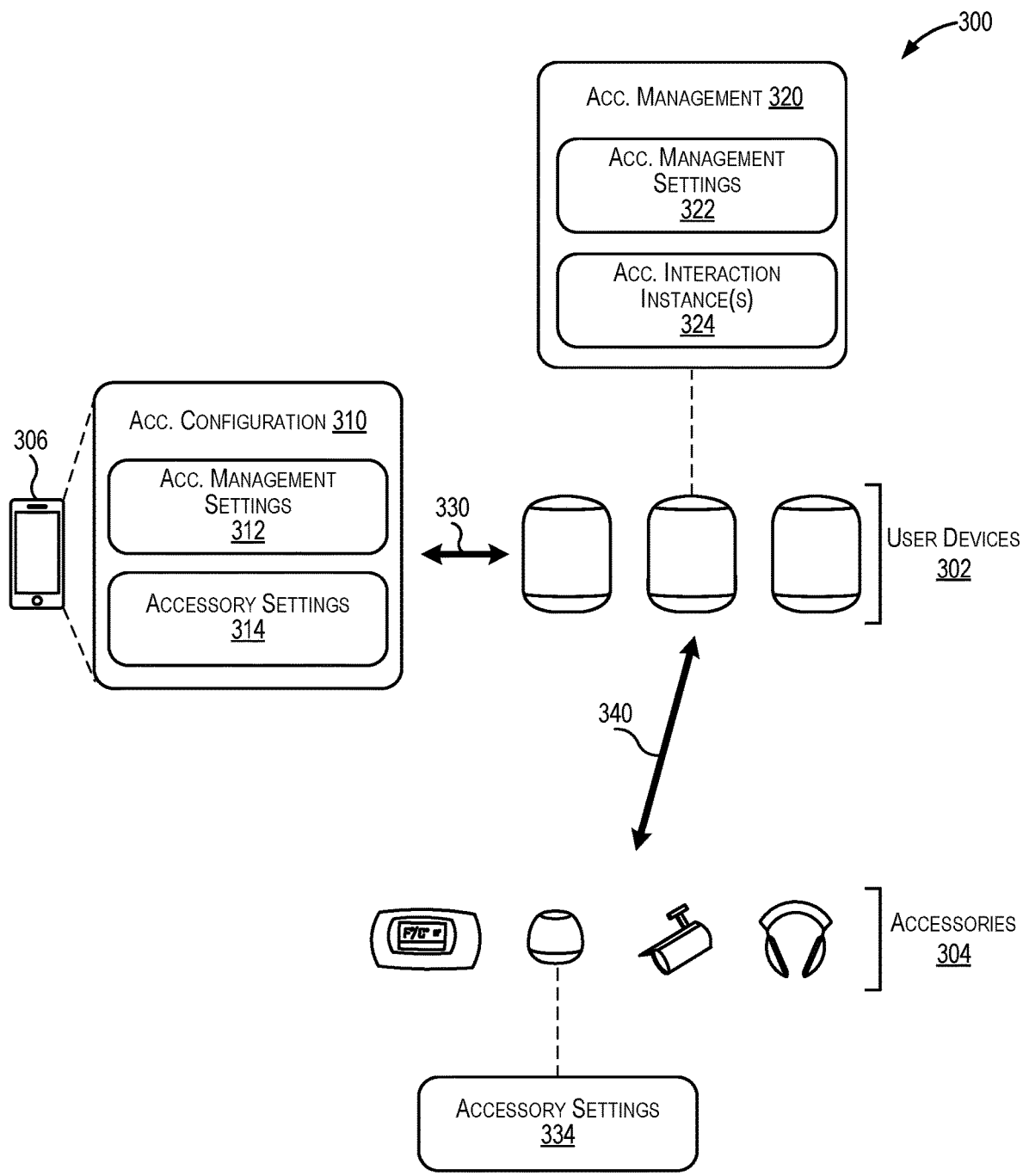
FIG. 3 is another simplified block diagram illustrating at least some methods of coordinating communications between user devices and accessory devices, according to some embodiments.

FIG. 3 illustrates an example coordination process 300 for associating one or more user devices 302 with one or more accessories 304. In some embodiments, the user devices 302 can correspond to user devices described herein (e.g., user device 110 of FIG. 1, user devices 202, 204, and 206 of FIG. 2, etc.). Configuration device 306, depicted here to be a smartphone, can be a user device among the user devices 302, a hub device, a leader device, or other devices used to configure the device associations. The configuration device 306 can be configured to communicate with the user devices 302 and accessories 304 over one or more networks described herein, including a LAN or a WAN. In some embodiments, the configuration device 306 is a remote server device configured to communicate with the user devices 302 and accessories 304 over a WAN, e.g., the Internet.

Multiple elements of the coordination process 300 are presented in more detail. The configuration device 306 can comprise an accessory configuration module 310. The accessory configuration module 310 can be a software process running on the configuration device 306. The accessory configuration module 310 can be configured to store, update, receive, and transmit information related to the association of accessories 304 and user devices 302. That information can include accessory management settings 312 and accessory settings 314. The accessory management settings 312 can comprise information identifying which accessories 304 are assigned to any particular device among the user devices 302. The accessory configuration module 310 can also include accessory settings 314 that can provide association information about an assigned user device for each accessory.

Each of the user devices 302 can comprise an accessory management module 320, which can be a software process running on the user device 302. The accessory management module 320 can, in some embodiments, receive, process, store, update, and transmit accessory management settings 322. The accessory management settings 322 correspond to the information in the accessory management settings 312 associated with the particular user device 302. For a particular user device, its accessory management settings 322 can include a list of all accessories assigned to that user device and other information related to the capabilities of those assigned accessories. The accessory management module 320 can also comprise accessory interaction instance(s) 324, which can correspond to the accessory interaction instances 122, 124, and 126 of FIG. 1. The accessory interaction instance(s) 324 can be created by the user device 302 based upon the accessory management settings 322 it receives from the configuration device 306. In this way, the configuration device 306 can update the associations of accessories 304 with user devices 302 by sending each user device an updated accessory management settings 322 based on an updated accessory management settings 312. The accessory management module 320 on each user device can then create or remove accessory interaction instance(s) 324 as necessary so that it has accessory interaction instance(s) 324 corresponding to its currently associated accessories.

Each accessory can also store accessory settings 334. The accessory settings 334 can comprise information identifying the user device to which the accessory is currently associated. The accessory settings 334 can also include information pertaining to the processing of a trigger or wake word at the accessory. For example, a user may change the wake word that they want to activate (e.g., "wake") the device, which may differ from a generic wake word and be identifiable with that particular user. The configuration device 306 can transmit corresponding information about the custom wake word (e.g., audio patterns of the wake word for comparing to received audio input) to the accessory devices 304. The accessory settings 334 can be configured to include information about multiple wake word or trigger configurations corresponding to different wake words or triggers that can be detected at the accessory devices 304.

Completing the detailed elements of FIG. 3, process indicators 330, 340 represent data transmission between the configuration device 306 and the user devices 302 and the user devices 302 and the accessories 304, respectively. The process indicators 330, 340 can indicate communication over one or more networks between the various devices as described herein, including, but not limited to, a WiFi LAN, or an Internet WAN. Process indicator 330 indicates transmission of data within the accessory management settings 312 and the accessory settings 314 to the user devices 302. Correspondingly, the user devices 302 can transmit data within their accessory management settings 322 or other data to the configuration device 306. This data can identify that one or more accessories is no longer in communication with its assigned user device. Similarly, process indicator 340 indicates transmission of data including accessory settings 334 between the user devices 302 and the accessories 304. In some embodiments, the configuration device 306 can also communicate directly with the accessories to transmit accessory settings 314 and receive information in return.

As a specific example of the foregoing description of several embodiments, consider the scenario where a new accessory device is introduced into a home environment. The home environment can correspond to the home environment 200 of FIG. 2. Initially, none of the devices in the home environment have any information pertaining to the new accessory, and no user devices are associated with it. The configuration device 306 can be a user's smartphone and can obtain information about the new accessory. This information can be obtained through user input, for example, through an application running on the smartphone to configure and provision devices within a home environment. The information can also include identification of the new accessory from list of recognized accessories that can be added to a home environment, or through communication with the new accessory by the smartphone over one of the networks in the home environment. The smartphone can then communicate with user devices 302 within the home environment to receive information about the user devices 302 and the current accessories 304 that they are associated with. Once the smartphone has appropriate information about the new accessory and the existing devices, it can update the accessory management settings 312 and accessory settings 314 in its accessory configuration module 310 and then assign the new accessory to one of the user devices 302. The assignment can include transmitting data corresponding to the accessory management settings 322 to the selected user device and transmitting data corresponding to the accessory settings 334 to the new accessory.

In a corresponding specific example, an accessory may be removed from the home environment. This can occur if the accessory is a non-resident device and is capable of leaving the home environment (e.g., a smartwatch) or if the accessory has lost network communication with its assigned user device. In this instance, the user device can transmit updated accessory management settings 322 to the configuration device 306, which can in turn update its accessory management settings 312 and accessory settings 314 and transmit updated information back to the user device. Updating the accessory management settings 312 can include reconfiguring the arrangement of accessories 304 still present in the home environment with the user devices 302. Similar updates can occur if a user device is removed (e.g., if it is a non-resident device like a smartphone or has lost network connectivity). Accessories previously associated with the removed user device can communicate with the configuration device 306 and report updated accessory settings 334, including the inability to communicate with the assigned user device. The configuration device 306 can then select a new user device for association with the accessory and transmit updated accessory management settings 322 and accessory settings 334 to the respective devices.

It should be understood that various scenarios described in reference to process 300 are representative. One or more aspects of each scenario may be changed, and still perform embodiments as described herein, including, but not limited to, the number and type of accessories, the number and type of user devices, the type of network over which the configuration device communicates with the other devices, and the manner in which the configuration device obtains information about a new accessory device.

Figure 4:
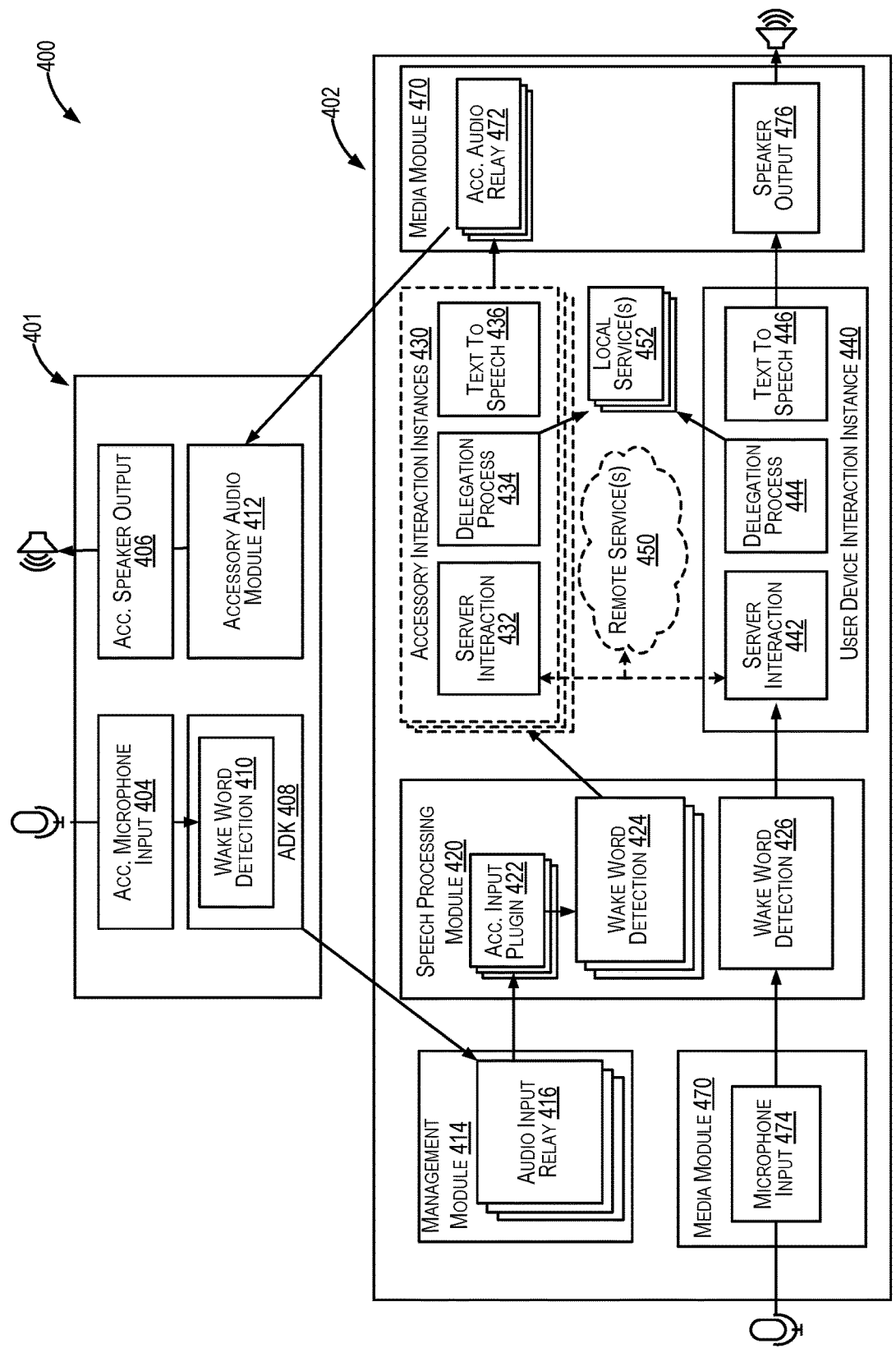
FIG. 4 is a block diagram illustrating at least some techniques for communication between an accessory device and a user device.

FIG. 4 is a block diagram 400 illustrating at least some techniques for communication between an accessory device 401 and a user device 402 to process an audio input to create a response. The diagram 400 includes some detailed architecture of representative devices as well as process flow arrows providing a general indication of the transfer of data or information. The process flow arrows are not intended to connote any specific architectural connections between the elements detailed herein. Each of the elements depicted in FIG. 4 may be similar to one or more elements depicted in other figures described herein. For example, the accessory device 401 may correspond to one or more of the accessories and accessory devices described herein, and so forth. In some embodiments, at least some of the elements in diagram 400 may operate within the context of a home environment like the home environment 200 of FIG. 2.

Turning to each element in further detail, accessory device 401 can have audio input and output functionality, including an accessory microphone input 404 and an accessory speaker output 406. The accessory microphone input 404 can include both hardware and software/firmware necessary to provide audio input functionality. Similarly, the accessory speaker output 406 can include both hardware and software to provide its functionality. The accessory device 401 also has an accessory audio module 412 that can interface with one or both of the accessory microphone input 404 and the accessory speaker output 406, as well as receive audio from other devices. The accessory device 401 also comprises an accessory development kit ("ADK") 408. The ADK can be an SDK stored and configured to be executed or processed on the accessory device 401. As used herein, an SDK can include application programming interfaces and related software libraries sufficient to enable the operation of other software within or associated with the SDK. In some embodiments, the ADK can be provided by an entity associated with the user device 402 (e.g., its manufacturer). The ADK 408 can include a wake word detection module 410 that performs a first processing of a portion of an audio input corresponding to a trigger or wake word. The wake word detection module 410 can itself contain information about wake words and triggers, including, for example, triggering criteria and audio patterns corresponding to specific wake words. As shown by the process flow arrows, the accessory device 401 can receive an audio input at its microphone 404 and then process a portion of that audio in a wake word detection module 410. This processing can be done at a first level to determine the presence of the wake word. The first level processing can be done in a time and resource efficient manner that determines that the wake word may be present. If the wake word is detected, the received audio input can be transmitted to the user device 402. In some embodiments, this transmission involves establishing a streaming audio connection from the accessory device 401 to the user device 402.

The user device 402 can include a management module 414, which can correspond to the accessory management module 320 of FIG. 3. The management module 414 can provide one or more audio input relays 416, each associated with an accessory device. In this way the user device 402 can manage multiple inbound audio inputs received from multiple accessory devices, including multiple simultaneous streaming audio connections. The audio input relay 416 can send the received audio input to a speech processing module 420, where it is received by an accessory input plugin 422. In some embodiments, the speech processing module 420 does not have a running instance for each accessory device associated with the user device. In these cases, the speech processing module can have separate, per-accessory instances of the accessory input plugin and wake word detection module 424.

As described above with respect to FIG. 1, the user device can process audio received from the accessory device. This can include the processing of a portion of the received audio to detect the presence of a wake word. The speech processing module 420 can include multiple instances of the wake word detection module 424, including, in some embodiments, a wake word detection module 426 configured to process an audio input received directly by the user device. The wake word detection module 424 can process the wake word audio at a second level that can confirm the presence of the wake word to a higher degree of probability than the wake word detection module 410 at the accessory device 401. If the speech processing module 420 does not detect the wake word, the user device 402 can ignore the audio input. If the wake word is detected, then the audio input can be further processed at the accessory interaction instances 430.

The accessory interaction instances 430 can comprise a virtual device assistant and include other processes such as server interaction module 432, delegation process 434, and text to speech module 436. To process the audio from a user request or other audio input that passes the wake word detection module 424, the accessory interaction instances 430 can connect to remote service(s) 450 and transmit a portion of the audio input to the remote service(s) 450. Each accessory interaction instance associated with an accessory can connect to the remote service(s) 450 separately through the server interaction module 432 corresponding to that accessory interaction instance. The remote service(s) 450 can be hosted on a remote server or other remote device and can be reached through one of the networks with which the user device can connect (e.g., the Internet WAN). NLP and other services used to process the audio input can comprise the remote service(s) 450. In addition, the remote service(s) can also include information related to user profiles, user languages, and user authorizations with regard to voice interaction between users and accessories and user devices within the home environment. In some embodiments, some components of user information or user profiles can be stored locally on the user device, and are accessible to the accessory interaction instances 430 via one of the local service(s) 452. As such, the remote service(s) can identify a user making the user request, process the audio input in a language that corresponds to the identified user, and determine whether the user is authorized to have that request executed by one or more devices. Since each accessory interaction instance 430 can interact separately and individually with the remote service(s) 450, multiple user requests can be processed and executed simultaneously or nearly simultaneously by a single user device 402.

Once a request has been processed, the accessory interaction instances 430 can receive a response from the remote service(s) 450 to execute. The response can contain data corresponding to an audio message to be played for the requesting user at the accessory device 401. An audio response can be generated by the text to speech module 436. In some embodiments, the response received may require that the accessory interaction instances 430 communicate with local service(s) 452 to receive additional information to complete the request. For example, if the request asked for the current time, the accessory interaction instances 430 could obtain the current time from a clock process or other service located elsewhere on the user device 402. In other embodiments, the response can require execution by another device, or an action with no further output expected of the user device 402 or the accessory device 401. In those cases, the accessory interaction instances 430 can delegate the response to the local service(s) 452 via the delegation process 434. The local service(s) 452 can include communication process for transmitting response instructions to other user devices for execution on those user devices or accessories associated with them. The local service(s) 452 can also include a music service. A user request can include a response to play music or other audio content at the accessory. The music service can then communicate with a media module 470 to transmit music or other audio to the accessory device 401 as described below. In still other embodiments, the response can include a delay, such that the delegation to the local service(s) 452 is temporary. For example, the request could be to set a timer, which can be delegated to a local timer process. The accessory interaction instance that delegated the response can then be free to handle additional request processing from its associated accessory until the delegation process 434 receives an indication that the timer process has completed, at which point the accessory interaction instance would finish executing the timer response by sending the appropriate indicator to the accessory.

Continuing with the detailed elements of the user device 402, an audio response can be sent to the accessory device 401 via a media module 470 that comprises an accessory audio relay 472. The accessory audio relay can negotiate an audio connection with the accessory device 401. The audio connection can be over one of the networks to which the user device 402 and accessory device 401 are connected and can use any number of methods or protocols, including, but not limited to AirPlay, Real-time Transport Protocol ("RTP"), Real Time Streaming Protocol ("RTSP"), or the like. In some embodiments, the response is a phrase or sentence converted to audible speech to be played at the accessory device 401. In other embodiments, the response can be an audio stream of music or similar media to be played at the accessory device 401. In still other embodiments, the response can be an indication to the accessory device 401 to play a piece of audio stored locally at the accessory device 401, for example, a notification chime particular to that accessory.

Depending on its capabilities, the accessory device 401 may not be configured to store received audio responses, which can be due to space limitations, the streaming nature of the audio responses, or other reasons. As described in more detail with respect to FIG. 7, below, the accessory interaction instances 430 can provide, as part of a response to a user request, instructions to the accessory device 401 for handling received audio in the event that the accessory device 401 receives multiple input audio responses or other audio inputs simultaneously or nearly simultaneously. The instructions can include rules for ducking or muting portions of the output audio in favor of other portions of the audio or providing other rules for mixing or balancing of levels of the output audio generated from the received audio responses. For example, a user may request at the accessory device 401 a timer and then later request that the accessory play a music stream. When the timer goes off, the accessory interaction instance on the user device 402 can send, with the response corresponding to the timer alert, instructions for the accessory device 401 to duck the streaming audio at the output so that the timer alert can be heard over the music.

Returning to the depiction in FIG. 4, in some embodiments the audio input relay 416, the accessory input plugin 422, the wake word detection module 424, and the accessory audio relay 472 represent multiple instances of the same or similar processes or modules running on the user device 402. The instances of these elements correspond to the associated accessory devices in the same manner as the accessory interaction instances 430 correspond to the associated devices. Depending on the software architecture, the accessory interaction instances as described herein can also encompass one or more of these instanced elements such that accessory interaction instances 430 comprise one or more audio input relay 416, accessory input plugin 422, wake word detection module 424, and accessory audio relay 472. Multiple ways to render the device architecture to provide per-accessory instances of various processes are contemplated.

Continuing with FIG. 4, the user device 402 can have its own microphone and speaker input and output functionality, represented by microphone input 474 and speaker output 476 within media module 470. In several embodiments, the user device 402 is capable of receiving an audio input and processing the audio directly by way of a wake word detection module 426 and a device interaction instance 440 that can comprise a digital virtual assistant and server interaction module 442, delegation process 444, and text to speech module 446. Other embodiments feature a user device that cannot directly receive an audio input but can still process audio data transmitted from an accessory device to accessory interaction instances. For example, a media player user device (e.g., a television media player) may not have a microphone input and thus cannot "hear" any user audio input. The media player can still be associated with one or more accessory devices and comprise one or more corresponding accessory interaction instances. The processing of a user request directly by the user device 402 proceeds similarly to the processing of audio received by an accessory device. Because the device interaction instance 440 and accessory interaction instances 430 are separate, a user device 402 can process a user request received from an accessory contemporaneously with a second user request received directly by the user device 402.

Figure 5:
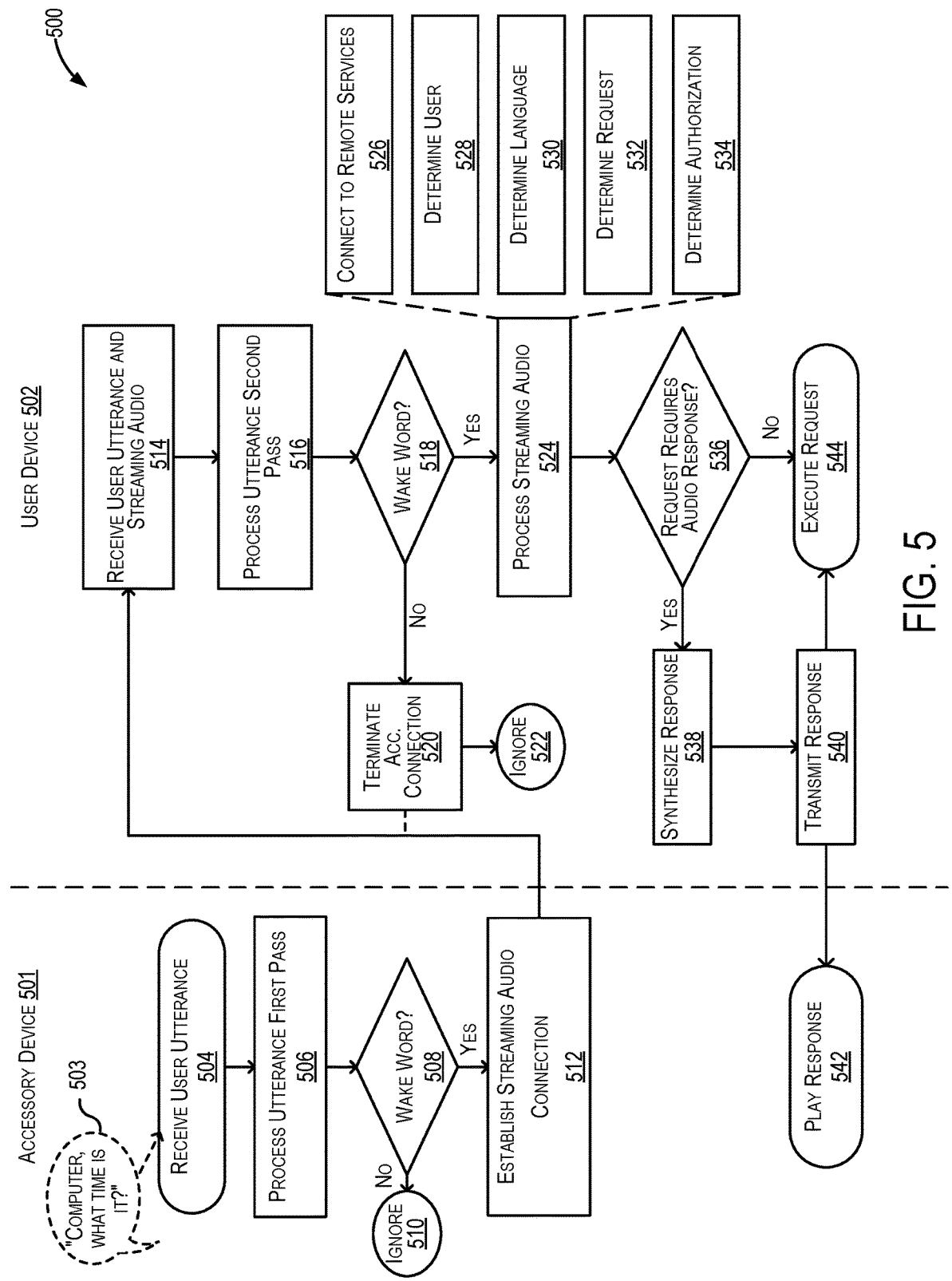
FIG. 5 is a flow diagram illustrating an example process for detecting and acting upon a user request by an accessory device and a user device, according to an embodiment.

FIG. 5 is a flow diagram illustrating a particular example process 500 for detecting and acting upon a user request by an accessory device and a user device. Each of the elements and operations depicted in FIG. 5 may be similar to one or more elements depicted in other figures described herein. For example, the user device 502 may be similar to other user devices, and so forth. In some embodiments, process 500 may be performed within a home environment (e.g. the home environment 200 of FIG. 2). Process 500, as well as processes 800 and 900 of FIGS. 8 and 9 (described below) are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

At block 504, an accessory device 501 may receive a user utterance 503. The user utterance can correspond to the audio input 120 of FIG. 1. The user utterance 503 can comprise a portion corresponding to a trigger or wake word (e.g., "Computer") and a portion corresponding to a user request (e.g., "what time is it?").

At block 506, the accessory device 501 can process the portion of the user utterance 503 corresponding to the wake word in a first pass to determine the presence of the wake word. The first pass processing can be done in a time and resource efficient manner that determines that the wake word may be present. At decision 508, based upon the first pass processing, the accessory device 501 determines if the wake word is present. If not, then the process can terminate at endpoint 510 by ignoring the user utterance. If the wake word is present according to the first pass processing, then the process continues to block 512.

At block 512, the accessory device 501 can establish a streaming audio connection with user device 502. This connection can occur over one of the networks to which the accessory device 501 and user device 502 are connected, for example over a WiFi LAN. The streaming audio can use any number of methods or protocols, including, but not limited to AirPlay, Real-time Transport Protocol ("RTP"), Real Time Streaming Protocol (RTSP), or the like. The user utterance 503 is then transmitted to the user device 502 over the streaming audio. In some embodiments, the portions of the user utterance 503 corresponding to the wake word and the user request can be received by the accessory device 501 separated by a period of time. Due to the first pass processing of the wake word portion, that portion may be sent to the user device 502 separately over a buffered audio connection via the WiFi LAN using Transport Control Protocol ("TCP") or other suitable method of sending recorded audio data.

At block 514, the user device 502 receives the user utterance 503 and any other streaming audio that is transmitted from the accessory device, which can include portions of a longer user request that are transmitted after the accessory device processes the wake word and opens the streaming audio connection. At block 516, the user device 502 can process the wake word for a second pass. This processing can be at a second level that can confirm the presence of the wake word to a higher degree of probability than the first pass processing at block 506 at the accessory device 501. At decision 518, if the user device 502 does not confirm the presence of the wake word, the process moves to block 520 and terminates the streaming audio connection. The process then moves to endpoint 522 and ignores the user utterance. If the user device 502 does confirm the presence of the wake word, then the process moves to block 524 and begins processing the other portions of the user utterance received from the streaming audio connection or that were transmitted with the wake word portion.

Block 524 can comprise additional blocks 526-534. These blocks represent parts of the process related to processing of speech by the user device 502 or a remote server in communication with the user device 502. The blocks 526-534 are not necessarily arranged in a particular implied order, and processing the audio may require performing one, some, or all of the blocks. At block 526, the user device 502 can connect to remote services located at a remote server. The speech processing can include NLP or other speech analysis services provided as part of the remote services. In block 528, the user device or, in some embodiments, one or more of the remote services can determine the identity of the user who made the user utterance 503. This identification can be based upon user information or user profile data stored at the user device 502 or at a remote device to which the remote services have access. Similarly, at block 530, the user device or the remote services can determine a language for the user utterance. This determination can be based upon the user information associated with block 528 or from the NLP analysis or similar analysis. At block 532, as a result of the NLP or other speech processing analysis, the user's request is determined. This step includes parsing the request to determine the appropriate response and which device or devices should execute that response. In some embodiments, at block 534, the process can determine whether the identified user is authorized to make the request contained in the user utterance 503. For example, the user may not have authorization to access a streaming music service that the user device 502 could access and transmit to the accessory device. In this case, the response to the request could be playing a message to the user indicating their lack of appropriate authorization. Other authorization can encompass device level authorization. For example, the process at block 534 can determine that an accessory device is not authorized to interact with an associated accessory interaction instance, to request a specific response, or to be delegated a specific response to execute. Still other authorization can encompass higher level functions, like a user not having authorization to make specific types of voice requests of one or more devices within the home environment or being able to make any voice requests at all.

With the audio processed and a response determined, the process 500 moves to decision 536. Depending on the nature of the request, part or all of the response can require playing an audio response to the user at the accessory device 501. If the request requires an audio response, the process moves to block 538 and the user device can synthesize an audio message for the user. This synthesis can occur by way of a text to speech module on the user device 502. It can also include selecting from among a number of previously prepared responses that correspond to commonly made requests or situations to which the user device 502 can respond. At block 540, the prepared response is transmitted to the accessory device 501, which plays that response at endpoint 542.

At endpoint 544, the user device executes the request according to the response determined from the audio processing. Execution of the response can include delegating one or more elements of the response to other processes on the user device or another device, including other user or accessory devices in the home environment or a remote device. Some examples include delegating to a music streaming process or voice communication service which can then connect the user device 502 to the accessory device and transmit streaming music or voice communications to the accessory device 501.

Figure 6:
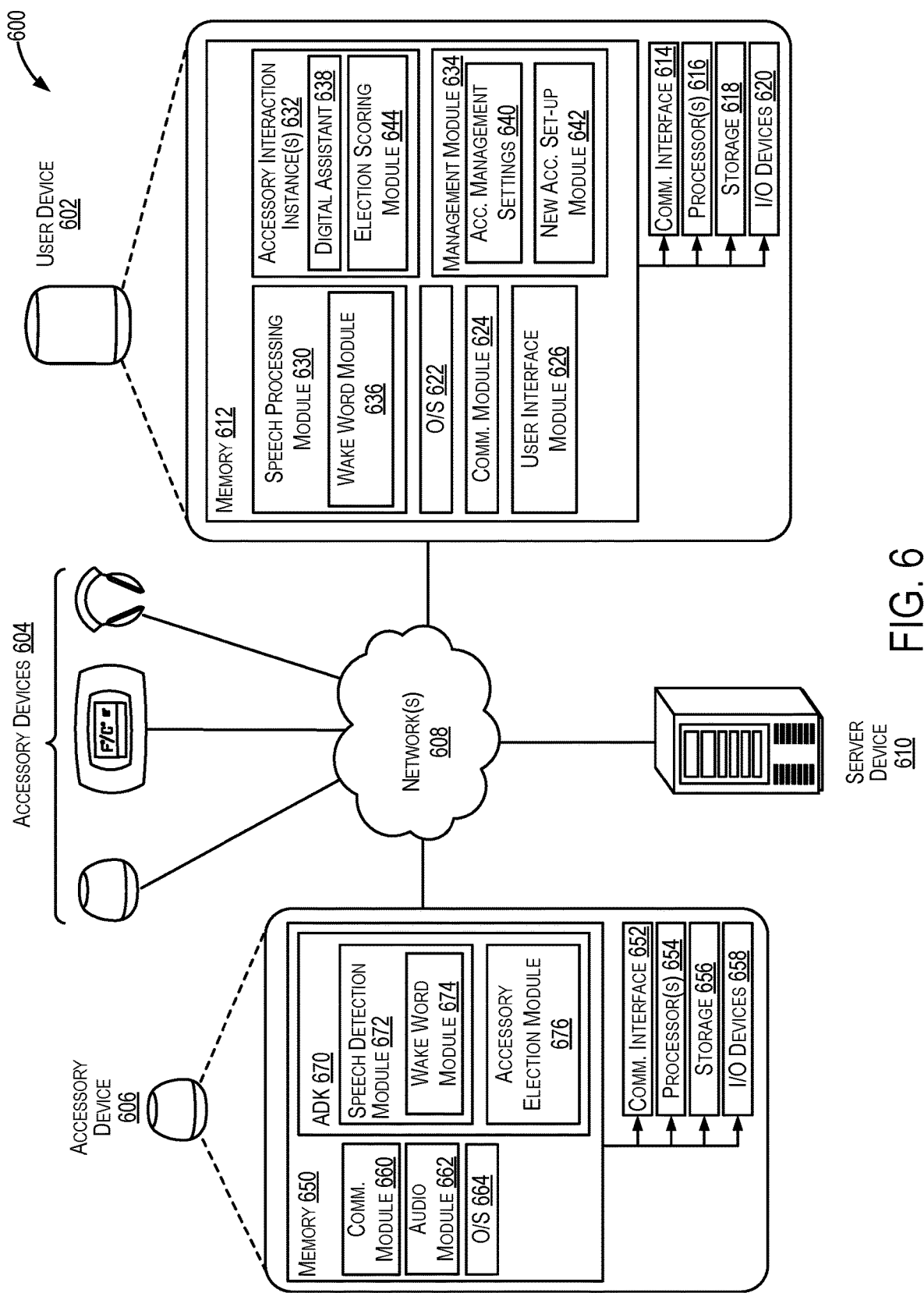
FIG. 6 is a simplified block diagram illustrating example architecture of a system used to detect and act upon a user request, according to some embodiments.

FIG. 6 is a simplified block diagram 600 illustrating an example architecture of a system used to detect and act upon a user request, according to some embodiments. The diagram includes a representative user device 602, one or more accessory devices 604, a representative accessory device 606, one or more network(s) 608, and a server device. Each of these elements depicted in FIG. 6 may be similar to one or more elements depicted in other figures described herein. In some embodiments, at least some elements of diagram 600 may operate within the context of a home environment (e.g. the home environment 200 of FIG. 2).

The accessory devices 604 and representative accessory device 606 may be any suitable computing device (e.g., smart speaker, smartwatch, smart thermostat, camera, etc.). In some embodiments, an accessory device may perform any one or more of the operations of accessory devices described herein. Depending on the type of accessory device and/or location of the accessory device (e.g., within the home environment or outside the home environment), the accessory device may be enabled to communicate using one or more network protocols (e.g., a Bluetooth connection, a Thread connection, a Zigbee connection, a WiFi connection, etc.) and network paths over the network(s) 608 (e.g., including a LAN or WAN), described further herein.

In some embodiments, the server device 610 may be a computer system that comprises at least one memory, one or more processing units (or processor(s)), a storage unit, a communication device, and an I/O device. In some embodiments, the server device 610 may perform any one or more of the operations of server devices described herein. In some embodiments, these elements may be implemented similarly (or differently) than as described in reference to similar elements of user device 602.

In some embodiments, the representative user device 602 may correspond to any one or more of the user devices described herein. For example, the user device 602 may correspond to one or more of the user devices of the home environment 200 of FIG. 2. The representative user device may be any suitable computing device (e.g., a mobile phone, tablet, a smart hub speaker device, a smart media player communicatively connected to a TV, etc.).

In some embodiments the one or more network(s) 608 may include an Internet WAN and a LAN. As described herein, the home environment may be associated with the LAN, whereby devices present within the home environment may communicate with each other over the LAN. As described herein, the WAN may be external from the home environment. For example, a router associated with the LAN (and thus, the home environment) may enable traffic from the LAN to be transmitted to the WAN, and vice versa. In some embodiments, the server device 610 may be external to the home environment, and thus, communicate with other devices over the WAN.

As described herein, user device 602 may be representative of one or more user devices connected to one or more of the network(s) 608. The user device 602 has at least one memory 612, a communications interface 614, one or more processing units (or processor(s)) 616, a storage unit 618, and one or more input/output (I/O) device(s) 620.

Turning to each element of user device 602 in further detail, the processor(s) 616 may be implemented as appropriate in hardware, computer-executable instructions, firmware or combinations thereof. Computer-executable instruction or firmware implementations of the processor(s) 616 may include computer-executable or machine executable instructions written in any suitable programming language to perform the various functions described.

The memory 612 may store program instructions that are loadable and executable on the processor(s) 616, as well as data generated during the execution of these programs. Depending on the configuration and type of user device 602, the memory 612 may be volatile (such as random access memory ("RAM")) or non-volatile (such as read-only memory ("ROM"), flash memory, etc.). In some implementations, the memory 612 may include multiple different types of memory, such as static random access memory ("SRAM"), dynamic random access memory ("DRAM") or ROM. The user device 602 may also include additional storage 618, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some embodiments, the storage 618 may be utilized to store data contents received from one or more other devices (e.g., server device 610, other user devices, accessory devices 604, or the representative accessory device 606). For example, the storage 618 may store accessory management settings, accessory settings, and user data associated with users affiliated with the home environment.

The user device 602 may also contain the communications interface 614 that allows the user device 602 to communicate with a stored database, another computing device or server, user terminals, or other devices on the network(s) 608. The user device 602 may also include I/O device(s) 620, such as for enabling connection with a keyboard, a mouse, a pen, a voice input device, a touch input device, a display, speakers, a printer, etc. In some embodiments, the I/O devices(s) 620 may be used to output an audio response or other indication as part of executing the response to a user request.

The memory 612 may include an operating system 622 and one or more application programs or services for implementing the features disclosed herein, including a communications module 624, a user interface module 626, a speech processing module 630, accessory interaction instance(s) 632, and a management module 634. The speech processing module further comprises a wake word module 636 and the accessory interaction instance(s) 632 further comprise a digital assistant 638.

The communications module 624 may comprise code that causes the processor(s) 616 to generate instructions and messages, transmit data, or otherwise communicate with other entities. For example, the communications module 624 may, in conjunction with management module 634, transmit and receive data associated with accessory settings, accessory management settings, accessory scoring from accessory devices 604, 606, other user devices, or the server device 610. As described herein, the communications module 624 may transmit messages via one or more network paths of network(s) 608 (e.g., via a LAN associated with the home environment or an Internet WAN).

The user interface module 626 may comprise code that causes the processor(s) 616 to present information corresponding to the accessory devices and user devices present within a home environment. For example, the user interface module 626 can present a graphical representation of user devices and the accessory devices currently associated with each accessory device. In some embodiments, the user interface module 626 can allow a user to provide configuration information about a new accessory device to be added to a home environment or allow the user to select user devices or accessory devices for removal from the home environment.

The speech processing module 630 can comprise code that causes the processor(s) 616 to receive and process an audio input corresponding to speech or other sound amenable to analysis by techniques described herein. In some embodiments, one or more of the operations of speech processing module 630 may be similar to those described in reference to block 524 of FIG. 5. Wake word module 636 can comprise code that causes processor(s) 616 to receive and process a portion of an audio input corresponding to a trigger or wake word. In some embodiments, one or more of the operations of the wake word module 636 may be similar to those described in reference to block 516 of FIG. 5 or wake word detection module 424 of FIG. 4. For example, wake word module 636 can analyze a portion of an audio input to determine the presence of a wake word. The speech processing module can also, in some embodiments, determine a language corresponding to the audio input and use that language to inform the analysis of the wake word portion.

The accessory interaction instance(s) 632 may comprise code that causes the processor(s) 616 to receive and process a portion of an audio input corresponding to a user request. In some embodiments, one or more of the operations of accessory interaction instance(s) 632 may be similar to those described in reference to accessory interaction instances 430 of FIG. 4. For example, the accessory interaction instance(s) 632 can comprise a number of processes or services that can cause the processor(s) 616 to send and receive data to a remote service, delegate the execution of a response to another process or service, or synthesize an audio response based on the speech analysis of the portion of the audio input. The accessory interaction instance(s) 632 may comprise a digital assistant 638 that can perform one or more of these example operations as well as additional operations related to the interaction between the accessory devices 604, 606 and the user device 602 as described herein. The accessory interaction instance(s) 632 may also comprise an election scoring module 644. In some embodiments, multiple accessory devices 604, 606 can receive the same audio input. In those cases, the election scoring module 644 can comprise code that causes the processor(s) to compute a score for a wake word received and processed at the user device (e.g., by the wake word module 636) and then transmit that score to the associated accessory device.

The management module 634 may comprise code that causes the processor(s) 616 to send and receive information to and from one or more accessory devices 604, 606 or other user devices. In some embodiments, one or more of the operations of the management module may be similar to those described in reference to accessory management module 320 of FIG. 3 and management module 414 of FIG. 4. For example, the management module may, in conjunction with the communications module 624, transmit and receive information corresponding to accessory devices 604, 606 associated with the user device 602. The management module 634 can include accessory management settings 640, and a new accessory set-up module 642. The accessory management settings 640 can include information corresponding to one or more accessory devices 604, 606 and their associations with one or more user devices within a home environment. The accessory management settings 640 can also include information corresponding to the features and capabilities of the accessory devices 604, 606, the user device 602, or other user devices. In some embodiments, the user device 602 can be a configuration device that can send and receive accessory information to add a new accessory device to home environment. The new accessory set-up module 642 can perform one or more of the processes included in configuring the association between the new accessory device and a selected user device.

Turning now to the details of the representative accessory device 606, the accessory device 606 can have, in some embodiments, at least one memory 650, a communications interface 652, processor(s) 654, a storage unit 656, and I/O devices 658. As described herein with respect to the user device 602, these elements of the accessory device can have the same appropriate hardware implementations as their counterparts on the user device 602.

The memory 650 of the accessory device 606 can include an operating system 664 and one or more application programs or services for implementing the features disclosed herein, including communications module 660, audio module 662, and ADK 670. As described herein with respect to the user device 602, the communications module 660 can have similar appropriate functionality as its counterpart communications module 624.

The audio module 662 may comprise code that causes the processor(s) 654, in conjunction with the I/O devices 658, to receive, process, and transmit audio signals. In some embodiments, one or more of the operations of the audio module may be similar to those described in reference to accessory audio module 412 of FIG. 4. For example, the audio module 662 can receive a user utterance or other audio input at a microphone with the I/O devices 658 and transmit that audio data to the user device 602 over a streaming audio channel or other suitable connection. The audio module 662 can also receive response audio from the user device 602 and play that audio at a speaker within the I/O devices 658.

The ADK 670 may comprise code that causes the processor(s) 654 to receive and process a portion of an audio input corresponding to a trigger or wake word. In some embodiments, one or more of the operations of the ADK 670 may be similar to those described in reference to ADK 408 of FIG. 4. The ADK 670 can comprise a speech detection module 672 and wake word module 674. Wake word module 674 can comprise code that causes processor(s) 654 to receive and process the wake word. In some embodiments, one or more of the operations of the wake word module 674 may be similar to those described in reference to block 506 of FIG. 5 or wake word detection module 410 of FIG. 4. For example, wake word module 674 can analyze a portion of an audio input to determine the presence of a wake word.

In some embodiments, the ADK 670 can also include an accessory election module 676. The accessory election module 676 may comprise code that causes processor(s) 654 to send and receive scores to and from accessory device 606 and user device 602, and cause the processor(s) 654 to compare received scores from the other accessories to determine a winning score. For example, when the wake word module receives a wake word for processing, the accessory election module 676 can communicate with other accessory devices 604 to hold an election to determine which accessory device should respond to the wake word. This process is described in detail with reference to FIG. 8 below.

Figure 7:
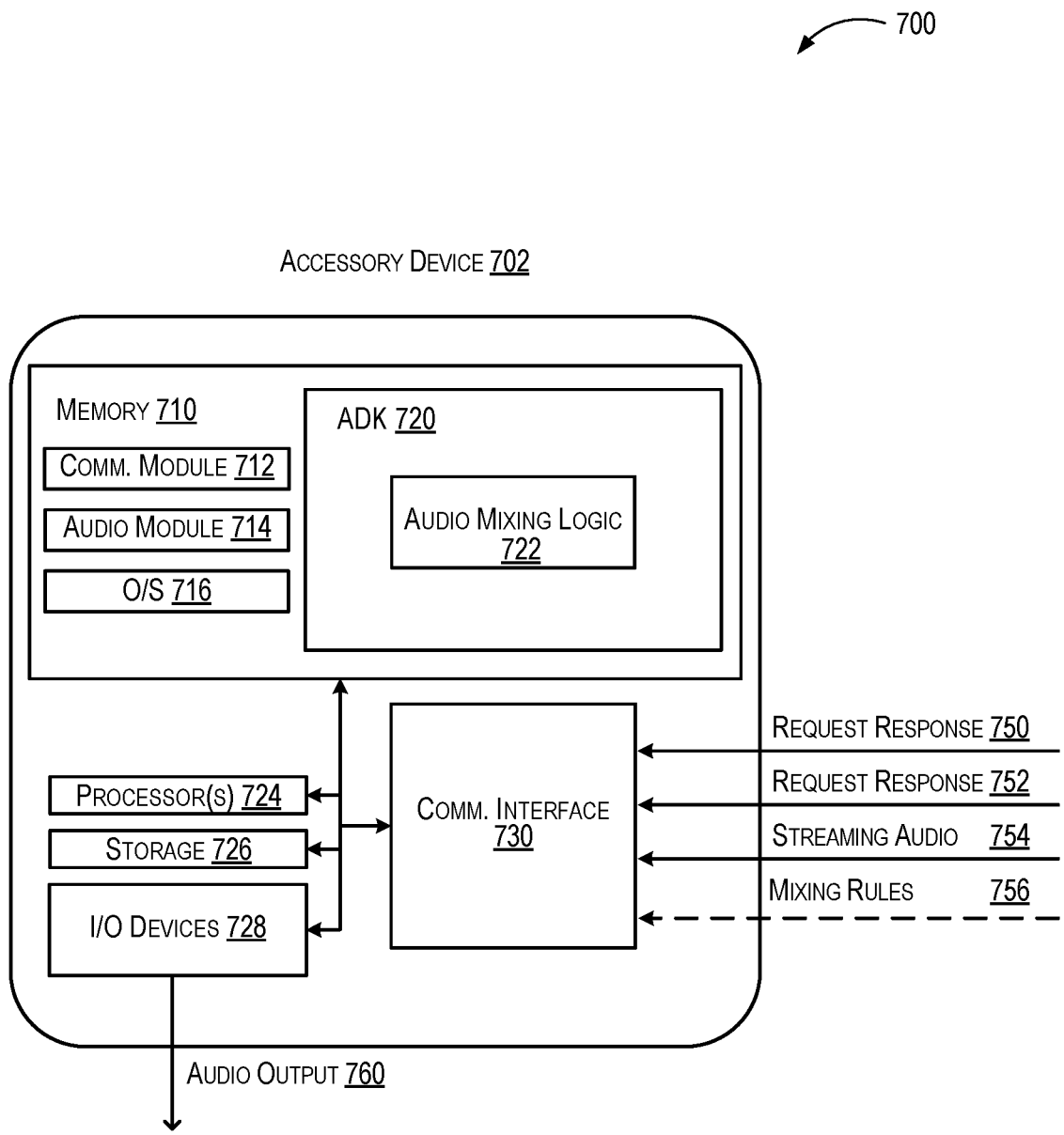
FIG. 7 is another simplified block diagram illustrating an example of an accessory device receiving and processing multiple communications from user devices, according to some embodiments.

FIG. 7 is another simplified block diagram 700 illustrating an example architecture of an accessory device 702 receiving and processing multiple communications from user devices, according to some embodiments. The accessory device 702 and each of the depicted elements therein may be similar to other accessory devices and similar elements depicted in other figures described herein, including accessory device 606 of FIG. 6. In some embodiments, the accessory device 702 may perform any one or more of the operations of accessory devices described herein. The accessory device 702 may be any suitable computing device (e.g., a smart speaker, a smartwatch, etc.) and can include a memory 710, processor(s) 724, a storage unit 726, I/O devices 728, and a communications interface 730. Each of these elements can have an appropriate implementation in hardware, firmware, computer-executable instructions, or combinations thereof and have functionality similar to the computing devices described in detail with respect to FIG. 6, above, for the user device 602 and accessory device 606.

Turning to the elements of the memory 710 in more detail, the memory 710 can include a communications module 712, an audio module 714, an operating system 716, and an ADK 720. Each of these elements may be similar to those described in reference to the accessory device 606 of FIG. 6. In some embodiments, the ADK 720 can include audio mixing logic 722. The audio mixing logic can comprise code that, in conjunction with the communications module 712 and the audio module 714, causes the processor(s) 724 to receive, process, combine, mix, and output one or more audio sources. The audio sources can include one or more streaming audio inputs 754 or request responses 750, 752. In addition, the audio mixing logic 722 can also receive mixing rules 756. The mixing rules 756 can instruct the accessory device 702, via its audio mixing logic 722 or other elements of the ADK 720, to perform one or more audio mixing processes on the received audio input. The mixing rules 756 can be transmitted to the accessory device 702 by an associated user device and can be a part of a request response 750, 752, a streaming audio input 754, or a separate communication. The mixing rules 756 can provide instructions corresponding to the required volume of an incoming audio response, the required volume of any other audio response to be output contemporaneously with the incoming audio response, whether a currently output audio stream should be ducked or muted during the output of the incoming audio response or other audio response, etc.

As an example of the foregoing embodiments, consider the scenario where the accessory device 702, in response to a previous user request, is currently playing a music stream over its speaker. The user then makes another request at the accessory device (e.g., "Computer, what time is it?"). This request can be processed at an associated user device and the accessory device 702 can receive an audio response (e.g., "The time is 10:30 p.m."). This audio response can be accompanied by mixing rules generated by the user device that indicate that the audio response is to be played at the speaker with a particular volume over the top of the music stream and that the music stream should be ducked to a lower volume. The accessory device can apply the mixing rules and play the audio response over the music stream. As a further example, consider the addition of a second request corresponding to alarm (e.g., "Computer, set an alarm for 10:30 p.m."). In this case, the response for the request for the time and the response for the alarm can arrive at the accessory device 702 simultaneously or nearly so. The user device can generate mixing rules to indicate that both the music stream and the alarm indication should be muted until the time response is announced, followed by restoring the volume of the music stream to a ducked level and playing the alarm indication over the music stream. Many other rules, parameters, or combinations thereof are contemplated. In some embodiments, the audio mixing logic 722 can store mixing rules 756 such that the rules persist and apply to future request responses and other received audio. Subsequent mixing rules can modify or update the stored rule set. In other embodiments, the mixing rules 756 are transient and only apply to one or more request responses or audio inputs currently received or playing at the accessory device 702.

Figure 8:
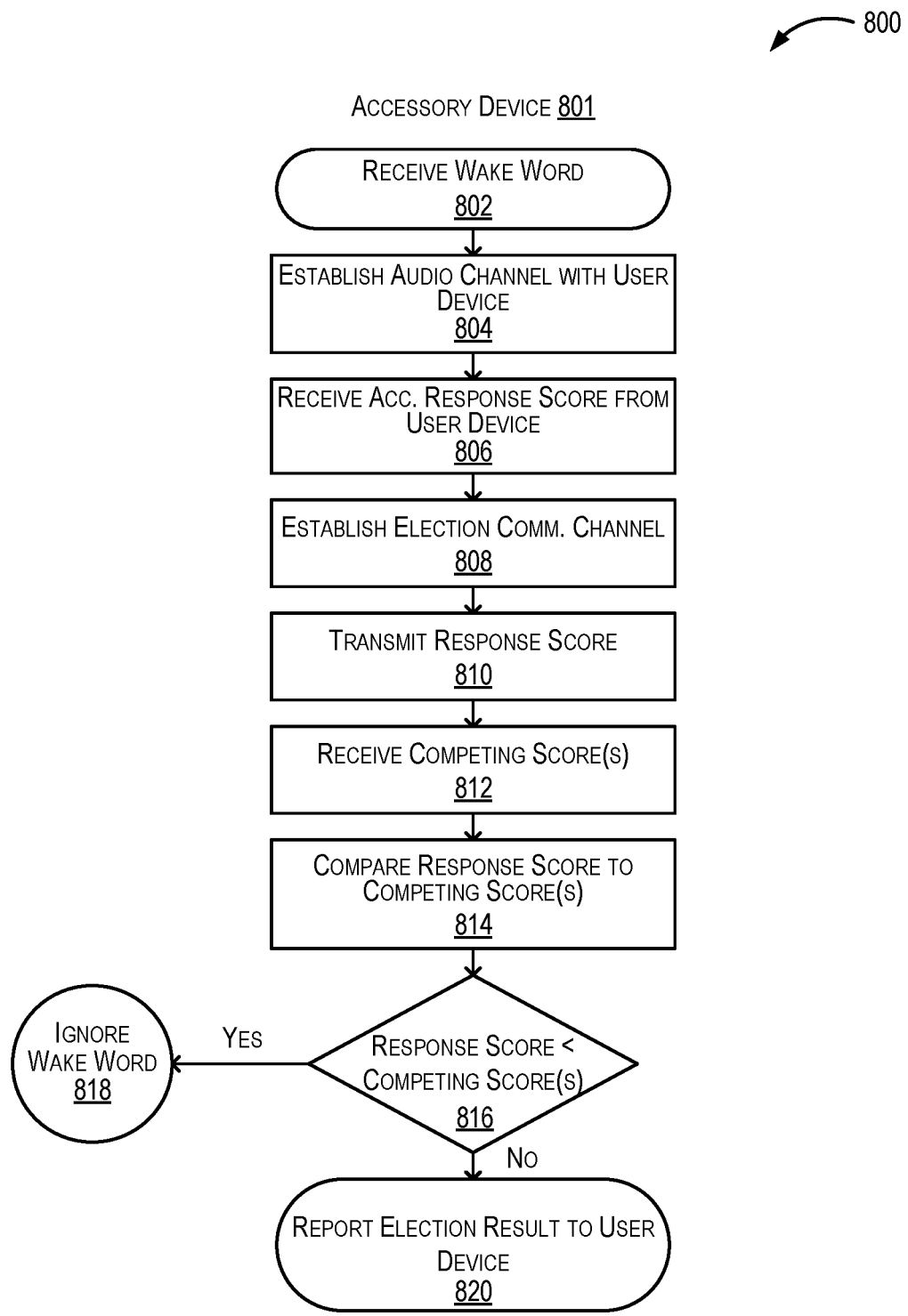
FIG. 8 is a flow diagram showing a process for an accessory device to determine which among a plurality of accessory devices will respond to a user request, according to some embodiments.

FIG. 8 is a flow diagram showing a process 800 for an accessory device 801 to determine which among a plurality of accessory devices will respond to a user request, according to some embodiments. The accessory device 801 can correspond to any one or more of the accessory devices described herein. In some embodiments, some or all of the processes may be performed by one or more user devices or another device (e.g., a server device), which may, respectively, correspond to any of the user devices or server devices/server computers described herein.

At block 802, the accessory device 801 can receive a wake word. In some embodiments, the wake word can correspond to a portion of an audio input received at the accessory device 801, including a user utterance. Block 802 can also encompass processing the wake word at a first level, similar to the wake word detection module 410 of FIG. 4.

At block 804, the accessory device 801 can establish an audio channel with a user device. The accessory device 801 can transmit the wake word over the audio channel to the user device. At block 806, the accessory device can receive an accessory response score from the user device. The accessory response score can be based on an analysis of the wake word sent to the user device. In some embodiments, the score is based on criteria including, but not limited to, strength (e.g., loudness) of the received audio input at the accessory device, quality of the received audio input, the capabilities of the accessory device, and the capabilities of a user device associated with the accessory device.

At block 808, the accessory device 801 can open an election communications channel with one or more accessory devices that may have received audio inputs from the same user utterance or other audio source. The election communications channel may also be configured to communicate with one or more user devices, such that the participants in the election include both accessory devices and user devices. In some embodiments, the communications channel can occur over one or more networks to which the accessory devices can communicate. In other embodiments, an ad-hoc network or other small area network or LAN can be established for the purpose of the election. For example, the accessory devices may establish an anonymous election connection using Bluetooth to send and receive election scores.

At block 810, the accessory device 801 can transmit its accessory response score to other accessories connected to the election communication channel. At block 812, the accessory device receives competing scores from one or more other accessories. In some scenarios, no other accessory device or user device transmits a score to accessory device 801, in which case the accessory device can proceed as if it had won the election. Once scores are received from all participant devices, the process can move to block 814 where the accessory device 801 compares its score to all other received scores. At the same time, in some embodiments, the other participant devices are performing the same or similar comparisons between their scores and the score transmitted by the accessory device 801. The comparison can include a simple comparison between numerical scores. In some embodiments, the scores can be generated in such a way to ensure that there is a unique winner (i.e. no ties). As depicted here in FIG. 8, a "better" score is indicated as being greater than a less desirable score, such that the election winner will have the higher score. Other scoring systems are possible that change the comparison hierarchy but do not change the outcome of the election process as described herein.

At decision 816, if the accessory device receives a score from another accessory that exceeds its own score, the process can proceed to endpoint 818 and the accessory device can ignore the wake word. Ignoring the wake word can include terminating the audio channel with the associated user device. If the response score of accessory device 801 is greater than all other received scores from other participant devices, then the accessory device 801 has won the election. The process moves to endpoint 820 where the accessory device 801 reports its victory to its associated user device. The election can determine which among multiple devices receiving an audio input is the preferred device for responding to that input. The winning device can continue to other operations relating to receiving or executing a response to the audio input.

Figure 9:
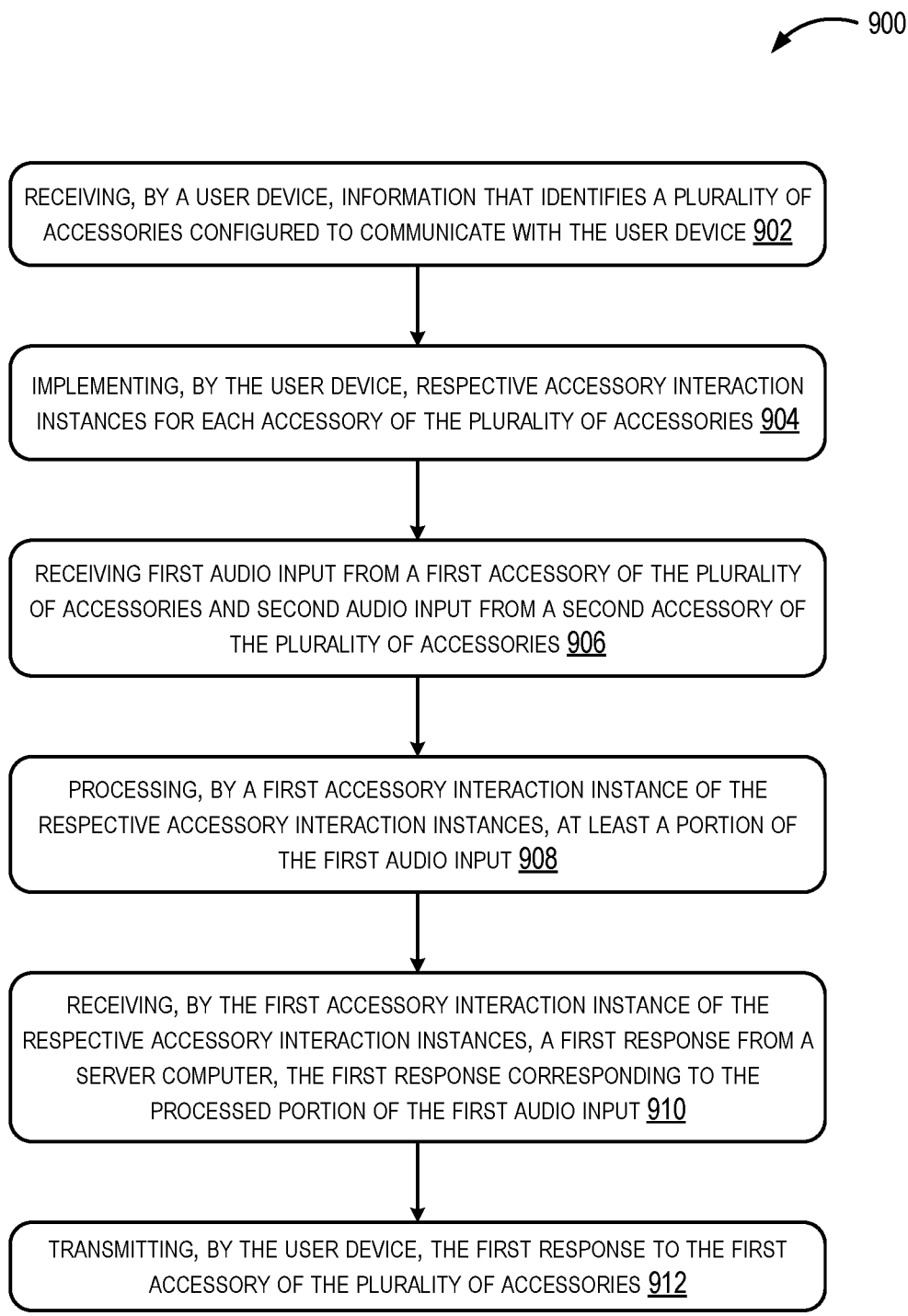
FIG. 9 is a flow diagram illustrating a process for a user device to coordinate interactions with a plurality of accessory devices, according to some embodiments.

FIG. 9 is another simplified flow diagram illustrating an example process 900 for a user device to coordinate interactions with a plurality of accessory devices. In some embodiments, one or more of the operations of process 900 may be similar to those as described in reference to FIGS. 1 and 4.

At block 902, a user device may receive information identifying one or more accessories that are able to communicate with the user device. In some embodiments, one or more of the operations of block 902 may be similar to one or more operations described for process indicator 330 in reference to FIG. 3.

At block 904, the user device can implement an accessory interaction instance corresponding to each of the accessories identified in block 902. In this way, the user device can have an accessory interaction instance associated with each identified accessory, such that operations performed by the user device that interact with an accessory device can be managed by one accessory interaction instance without impacting the user device's interaction with other accessory devices. In some embodiments, one or more of the operations of block 904 may be similar to one or more operations of block 102 of FIG. 1.

At block 906, the user device can receive a first audio input from a first accessory and a second audio input from a second accessory, where the first and second accessories are among those previously identified in block 902 and associated with an accessory interaction instance in block 904. The first and second audio inputs can correspond to user utterances or other audio source received at the first and second accessories. In some embodiments, the first and second audio inputs can have the same audio source.

At block 908, a first accessory interaction instance of the user device can process at least a portion of the first audio input received in block 906. The first accessory interaction instance can be the accessory interaction instance that corresponds to the first accessory. The portion of the first audio input can correspond to a user request, such that the processing by the accessory interaction instance can parse or otherwise analyze the request and determine a response. Processing the portion of the first audio input can include transmitting the portion to a server computer for analysis. The first audio input need not contain a request, and the processing can determine an appropriate response based upon the analyzed portion. In some embodiments, one or more of the operations of block 908 may be similar to one or more operations of block 524 of FIG. 5.

At block 910, the first accessory interaction instance can receive a first response from a server computer that corresponds to the processed portion of the first audio input. In some embodiments, the analysis of the portion of the audio input is performed by server computer, such that the server computer parses any request or determines a first response corresponding to the processed portion. The analysis can included techniques like NLP or other speech processing. In some embodiments, one or more of the operations of block 910 may be similar to one or more operations of blocks 524 and 532 of FIG. 5.

At block 912, the user device can transmit the first response to the first accessory. In some embodiments, one or more of the operations of block 904 may be similar to one or more operations of block 540 of FIG. 5.

Illustrative techniques for coordinating interactions between a user device and a plurality of accessory devices are described above. Some or all of these techniques may, but need not, be implemented at least partially by architectures such as those shown at least in FIGS. 1-9 above. While many of the embodiments are described above with reference to server devices, accessory devices, and user devices, it should be understood that other types of computing devices may be suitable to perform the techniques disclosed herein. Further, in the foregoing description, various non-limiting examples were described. For purposes of explanation, specific configurations and details are set forth in order to provide a thorough understanding of the examples. However, it should also be apparent to one skilled in the art that the examples may be practiced without the specific details. Furthermore, well-known features were sometimes omitted or simplified in order not to obscure the example being described.

Although specific example embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

As described above, one aspect of the present technology is the gathering and use of data available from specific and legitimate sources to improve the delivery to users of invitational content or any other content that may be of interest to them when updating firmware. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, and exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

The various embodiments further can be implemented in a wide variety of operating environments, which in some cases can include one or more user computers, computing devices or processing devices that can be used to operate any of a number of applications. User or client devices can include any of a variety of different types of computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle Microsoft®, SAP®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory ("EEPROM"), flash memory or other memory technology, CD-ROM, DVD or other optical storage, magnetic cassettes, magnetic tape, magnetic disk storage or other magnetic storage devices or any other medium that can be used to store the desired information and that can be accessed by the a system device. Based at least in part on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a," "an," and "the," and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based at least in part on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode. Variations of those preferred embodiments may become apparent to those of ordinary skill in the art upon reading the foregoing description. It is expected that skilled artisans should be able to employ such variations as appropriate, and it is intended for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method, comprising:
receiving, by a user device, information that identifies a plurality of accessories configured to communicate with the user device;
generating, by the user device, at least a first accessory interaction instance of respective accessory interaction instances for a first accessory of the plurality of accessories and a second accessory interaction instance of the respective accessory interaction instances for a second accessory of the plurality of accessories, the first accessory interaction instance of the respective accessory interaction instances and the second accessory interaction instance of the respective accessory interaction instances being configured to execute separately from each other;
receiving, by the first accessory interaction instance, a first audio input from the first accessory of the plurality of accessories;
receiving, by the second accessory interaction instance, a second audio input from the second accessory of the plurality of accessories;
processing, by the first accessory interaction instance of the respective accessory interaction instances, at least a portion of the first audio input;
receiving, by the first accessory interaction instance of the respective accessory interaction instances, a first response from a server computer, the first response corresponding to the processed portion of the first audio input; and
transmitting, by the user device, the first response to the first accessory of the plurality of accessories.

2. The method of claim 1, wherein the processing, by the first accessory interaction instance of the respective accessory interaction instances, of the portion of the first audio input comprises:
transmitting, by the first accessory interaction instance, the processed portion of the first audio input to the server computer.

3. The method of claim 2, wherein the processing, by the first accessory interaction instance of the respective accessory interaction instances, of the portion of the first audio input further comprises:
delegating, by the first accessory interaction instance, an action to one or more other processes.

4. The method of claim 3, wherein the one or more other processes comprise at least one of a music service or a voice communication service, and wherein the action comprises instructions for the one or more other processes to provide audio content for the first accessory.

5. The method of claim 1, further comprising:
determining, by the user device, whether at least a portion of the second audio input matches a wake word; and
determining, by the user device, whether the second accessory is authorized to interact with a second accessory interaction instance of the respective accessory interaction instances.

6. The method of claim 5, further comprising:
processing, by the second accessory interaction instance of the respective accessory interaction instances, at least a portion of the second audio input in accordance with at least one of the determination that the portion of the second audio input matches the wake word or the determination that the second accessory is authorized to interact with the second accessory interaction instance of the respective accessory interaction instances.

7. The method of claim 1, wherein each of the plurality of accessories are configured to implement a software development kit provided by an entity associated with the user device.

8. The method of claim 7, wherein each of the respective accessory interaction instances are configured to communicate with a corresponding software development kit of respective accessory of the plurality of accessories.

9. The method of claim 1, further comprising managing, by the user device, respective accessory settings for each of the plurality of accessories.

10. The method of claim 1, wherein the user device is a first user device, and wherein the information comprises at least one of:
a request, from at least one of the accessories of the plurality of accessories, to connect to the first user device; or
an instruction, from a second user device, to connect the first user device to at least one of the accessories of the plurality of accessories.

11. A user device, comprising:
a memory configured to store computer-executable instructions; and
a processor configured to connect to the memory and execute the computer-executable instructions to at least:
receive information that identifies a plurality of accessories configured to communicate with the user device;
implement at least a first accessory interaction instance of respective accessory interaction instances for a first accessory of the plurality of accessories and a second accessory interaction instance of the respective accessory interaction instances for a second accessory of the plurality of accessories, the first accessory interaction instance of the respective accessory interaction instances and the second accessory interaction instance of the respective accessory interaction instances being configured to execute separately from each other;
receive, by the first accessory interaction instance, first audio input from the first accessory of the plurality of accessories;
receive, by the second accessory interaction instance, a second audio input from the second accessory of the plurality of accessories;

process, by the first accessory interaction instance of the respective accessory interaction instances, at least a portion of the first audio input;
receive, by the first accessory interaction instance of the respective accessory interaction instances, a first response from a server computer, the first response corresponding to the processed portion of the first audio input; and
transmit the first response to the first accessory of the plurality of accessories.

12. The user device of claim 11, wherein the processing, by the first accessory interaction instance of the respective accessory interaction instances, of the portion of the first audio input comprises at least one of:
transmitting, by the first accessory interaction instance, the processed portion of the first audio input to the server computer; or
delegating, by the first accessory interaction instance, an action to one or more other processes.

13. The user device of claim 11, wherein the processor is configured to execute the computer-executable instructions to at least:
determine whether at least a portion of the second audio input matches a wake word; and
determine whether the second accessory is authorized to interact with a second accessory interaction instance of the respective accessory interaction instances.

14. The user device of claim 13, wherein the processor is configured to execute the computer-executable instructions to at least:
process, by the second accessory interaction instance of the respective accessory interaction instances, at least a portion of the second audio input in accordance with at least one of the determination that the portion of the second audio input matches the wake word or the determination that the second accessory is authorized to interact with the second accessory interaction instance of the respective accessory interaction instances.

15. The user device of claim 11, wherein each of the plurality of accessories are configured to implement a software development kit provided by an entity associated with the user device.

16. A non-transitory computer-readable storage medium configured to store computer-executable instructions that, when executed by a user device, cause the user device to perform operations comprising:
receiving information that identifies a plurality of accessories configured to communicate with the user device;
implementing at least a first accessory interaction instance of respective accessory interaction instances for a first accessory of the plurality of accessories and a second accessory interaction instance of the respective accessory interaction instances for a second accessory of the plurality of accessories, the first accessory interaction instance of the respective accessory interaction instances and the second accessory interaction instance of the respective accessory interaction instances being configured to execute separately from each other;
receiving, by the first accessory interaction instance, a first audio input from the first accessory of the plurality of accessories;
receiving, by the second accessory interaction instance, a second audio input from the second accessory of the plurality of accessories;
processing, by the first accessory interaction instance of the respective accessory interaction instances, at least a portion of the first audio input;
receiving, by the first accessory interaction instance of the respective accessory interaction instances, a first response from a server computer, the first response corresponding to the processed portion of the first audio input; and
transmitting the first response to the first accessory of the plurality of accessories.

17. The non-transitory computer-readable storage medium of claim 16, wherein the processing, by the first accessory interaction instance of the respective accessory interaction instances, of the portion of the first audio input comprises at least one of:
transmitting, by the first accessory interaction instance, the processed portion of the first audio input to the server computer; or
delegating, by the first accessory interaction instance, an action to one or more other processes.

18. The non-transitory computer-readable storage medium of claim 16, wherein the operations further comprise:
determining, by the user device, whether at least a portion of the second audio input matches a wake word; and
determining, by the user device, whether the second accessory is authorized to interact with a second accessory interaction instance of the respective accessory interaction instances.

19. The non-transitory computer-readable storage medium of claim 18, wherein the operations further comprise:
processing, by the second accessory interaction instance of the respective accessory interaction instances, at least a portion of the second audio input in accordance with at least one of the determination that the portion of the second audio input matches the wake word or the determination that the second accessory is authorized to interact with the second accessory interaction instance of the respective accessory interaction instances.

20. The non-transitory computer-readable storage medium of claim 16, wherein each of the plurality of accessories are configured to implement a software development kit provided by an entity associated with the user device.

* * * * *